United States Patent
Ma et al.

(10) Patent No.: US 12,407,559 B2
(45) Date of Patent: Sep. 2, 2025

(54) SIGNAL SENDING METHOD, SIGNAL RECEIVING METHOD, ELECTRONIC DEVICE, AND STORAGE MEDIUM

(71) Applicant: ZTE CORPORATION, Shenzhen (CN)

(72) Inventors: Yihua Ma, Shenzhen (CN); Zhifeng Yuan, Shenzhen (CN); Shuqiang Xia, Shenzhen (CN); Guanghui Yu, Shenzhen (CN); Liujun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 47 days.

(21) Appl. No.: 18/692,090

(22) PCT Filed: Sep. 9, 2022

(86) PCT No.: PCT/CN2022/118227
§ 371 (c)(1),
(2) Date: Mar. 14, 2024

(87) PCT Pub. No.: WO2023/040780
PCT Pub. Date: Mar. 23, 2023

(65) Prior Publication Data
US 2024/0388491 A1    Nov. 21, 2024

(30) Foreign Application Priority Data
Sep. 14, 2021 (CN) .......................... 202111074948.8

(51) Int. Cl.
*H04L 27/26* (2006.01)
*H04L 5/00* (2006.01)

(52) U.S. Cl.
CPC .......... *H04L 27/2636* (2013.01); *H04L 5/001* (2013.01)

(58) Field of Classification Search
CPC ... H04L 27/2636; H04L 5/0007; H04L 5/001; H04L 27/2626; H04L 27/2639;
(Continued)

(56) References Cited

U.S. PATENT DOCUMENTS

2021/0076367 A1  3/2021 Bayesteh et al.
2021/0160819 A1  5/2021 Kim et al.
(Continued)

FOREIGN PATENT DOCUMENTS

CN    109391962 A    2/2019
CN    109995486 A    7/2019

OTHER PUBLICATIONS

International Search Report in Application No. PCT/CN2022/118227, dated Dec. 1, 2022, 4 pages, including translation.

*Primary Examiner* — Khanh C Tran
(74) *Attorney, Agent, or Firm* — Morgan, Lewis & Bockius LLP

(57) ABSTRACT

Disclosed are a signal sending method, a signal receiving method, an electronic device and a storage medium. The signal sending method includes the following. A first transmission signal is generated, where the first transmission signal includes a communication signal and a sensing signal, and the sensing signal occupies bandwidth resources of at least two component carriers in a frequency domain; and the first transmission signal is sent.

20 Claims, 10 Drawing Sheets

Generate a first transmission signal, where the first transmission signal includes a communication signal and a sensing signal, and the sensing signal occupies bandwidth resources of at least two component carriers in a frequency domain ~110

Send the first transmission signal ~120

(58) Field of Classification Search
CPC .............. H04L 27/2634; H04L 27/2628; H04L 27/263; H04L 27/00; H04L 25/00; H04L 27/2627; H04L 27/2647; H04L 27/2649; H04L 27/26524; H04L 27/26526; H04L 27/26532
See application file for complete search history.

(56) References Cited

U.S. PATENT DOCUMENTS

| | | | |
|---|---|---|---|
| 2021/0392516 A1* | 12/2021 | Park | H04L 5/0048 |
| 2022/0099796 A1* | 3/2022 | Zorgui | G01S 13/584 |
| 2023/0224696 A1* | 7/2023 | Li | H04L 5/0053 |
| | | | 370/252 |
| 2023/0231637 A1* | 7/2023 | Li | H04B 17/345 |
| | | | 370/252 |
| 2024/0345214 A1* | 10/2024 | Duan | H04L 27/2605 |

\* cited by examiner

SIGNAL SENDING METHOD, SIGNAL RECEIVING METHOD, ELECTRONIC DEVICE, AND STORAGE MEDIUM

CROSS REFERENCE TO RELATED APPLICATIONS

This is a national stage application filed under 37 U.S.C. 371 based on International Patent Application No. PCT/CN2022/118227, filed on Sep. 9, 2022, which is based on and claims priority to a Chinese Patent Application No. 202111074948.8 filed on Sep. 14, 2021, disclosures of which are incorporated herein by reference in their entireties.

TECHNICAL FIELD

The present application relates to the field of wireless communication technology, for example, a signal sending method, a signal receiving method, an electronic device and a storage medium.

BACKGROUND

With the development of communication technology, the communication spectrum is gradually moving towards millimeter waves and terahertz waves, resulting in overlap between future communication spectrum and conventional sensing spectrum. In future development, it is necessary to consider the integration of communication and sensing so that integrated sensing and communication technology for joint scheduling of communication resources and sensing resources. The manner to achieve integrated sensing and communication technology is based on orthogonal frequency-division multiplexing (OFDM) symbols to achieve sensing signals. For this implementation method, the related technology mainly includes content described below. 1. OFDM is used for generating two orthogonal sensing signals so that simultaneous transmission of orthogonal sensing signals is achieved. 2. An orthogonal basis based on sensing signals is used for replacing a discrete Fourier Transform (DFT) orthogonal basis in OFDM, and a transceiving structure similar to DFT-spread-OFDM (DFT-s-OFDM) may be used for signal sending. However, the available bandwidth of the preceding two implementation schemes is limited to one component carrier (CC). Carrier aggregation (CA) can aggregate two or more CCs together to support a larger transmission bandwidth. However, communication data transmits new messages depending on symbols modulated on the transmitted signal, while the transmitted sensing signal generally does not carry information or carries a small amount of information; the channel information is generally and mainly extracted from the received sensing signal. The transmission principles of sensing data and communication data are different, and a new carrier aggregation method is urgently needed for the sensing signal of integrated sensing and communication.

SUMMARY

The main purpose of embodiments of the present application is to propose a signal sending method, a signal receiving method, an electronic device and a storage medium, aiming to achieve the sending of sensing data in the signal of integrated sensing and communication, increase the transmission bandwidth of sensing data, and thus improving the accuracy of sensing data transmission.

The embodiments of the present application provide a signal sending method. The method includes the following.

A first transmission signal is generated, where the first transmission signal includes a communication signal and a sensing signal, and the sensing signal occupies bandwidth resources of at least two component carriers in a frequency domain; and the first transmission signal is sent.

The embodiments of the present application further provide a signal receiving method. The method includes the following.

A first received signal is received, where the first received signal includes a communication signal and a sensing signal, and the sensing signal occupies bandwidth resources of at least two component carriers in a frequency domain; and the first received signal is processed.

The embodiments of the present application further provide an electronic device. The electronic device includes one or more processors and a memory configured to store one or more programs.

The one or more programs, when executed by the one or more processors, cause the one or more processors to perform the signal sending method described in any embodiment of the present application and/or the signal receiving method described in any embodiment of the present application.

The embodiments of the present application further provide a computer-readable storage medium. The computer-readable storage medium is configured to store one or more programs executable by one or more processors to perform the signal sending method described in any embodiment of the present application and/or the signal receiving method described in any embodiment of the present application.

In the embodiment of the present application, the first transmission signal including the communication signal and the sensing signal is generated, where the sensing signal occupies bandwidth resources of at least two component carriers in the frequency domain, and the generated first transmission signal is sent. In this manner, the transmission of sensing data in the signal of integrated sensing and communication is implemented, the transmission bandwidth of the sensing data is increased, and thus the accuracy of sensing data transmission can be improved.

DETAILED DESCRIPTION

The embodiments described herein are intended to explain the present application and not to limit the present application.

Suffixes such as "module", "component" or "unit" used for indicating elements in the subsequent description are used for facilitating the description of the present application and have no particular meaning in themselves. Therefore, "module", "component" or "unit" may be used in a mixed manner.

Figure 1:
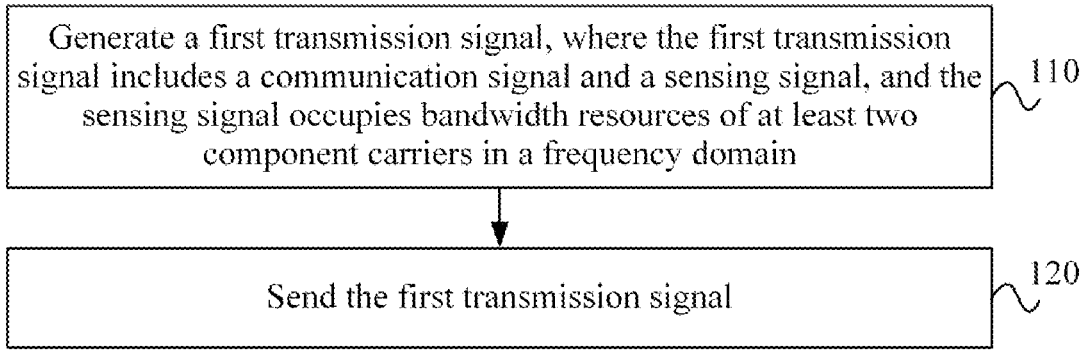
FIG. 1 is a flowchart of a signal sending method according to an embodiment of the present application.

FIG. 1 is a flowchart of a signal sending method according to an embodiment of the present application. The embodiment of the present application is applicable to sending signals of integrated sensing and communication. The method may be performed by an information sending apparatus. The apparatus may be implemented by software and/or hardware. Referring to FIG. 1, the method provided in the embodiment of the present application includes the following.

In 110, a first transmission signal is generated, where the first transmission signal includes a communication signal and a sensing signal, and the sensing signal occupies bandwidth resources of at least two component carriers (CCs) in a frequency domain.

The first transmission signal may be a signal of integrated sensing and communication. The first transmission signal may be a signal that integrates functions of communication and sensing. The first transmission signal may have functions of both the communication signal and the sensing signal. The first transmission signal can actively recognize and analyze characteristics of a wireless channel while information is transmitted through the wireless channel, thereby sensing physical characteristics of the surrounding environment and achieving the sensing function. The sensing signal may be a signal used for sensing the physical characteristics of the surrounding environment, and may be a component of the first transmission signal. The sensing signal may be generated through carrier aggregation. The sensing signal may occupy bandwidth resources composed of at least two component carriers. A component carrier may be a signal wave used for carrying signal transmission, and may be an electromagnetic wave such as a radio wave, a microwave, infrared rays, visible light or ultraviolet rays. The bandwidth resource of a carrier is the bandwidth that can be occupied on that carrier.

In the embodiment of the present application, the first transmission signal of integrated sensing and communication may be generated. The first transmission signal may include a communication signal with the communication function and a sensing signal with the sensing function. The sensing signal may be generated through carrier aggregation, and in the frequency domain, the sensing signal may occupy bandwidth resources of at least two carriers.

In 120, the first transmission signal is sent.

The generated first transmission signal may be sent so that the transmission of the signal of integrated sensing and communication is implemented.

In the embodiment of the present application, the first transmission signal including the communication signal and the sensing signal is generated, where the sensing signal occupies bandwidth resources of at least two component carriers in the frequency domain, and the generated first transmission signal is sent. In this manner, the sending of sensing data in the signal of integrated sensing and communication is implemented, the transmission bandwidth of the sensing data is increased, and thus the accuracy of sensing data transmission can be improved.

On the basis of the preceding embodiment of the present application, the at least two component carriers are sent by the same communication node.

In the embodiment of the present application, multiple component carriers that compose sensing information may be sent by the same communication node. For example, the sensing signal in the first transmission signal may be generated through carrier aggregation of multiple component carriers, and the preceding multiple component carriers may be sent by the same communication node, that is, multiple component carriers of the sensing signal may be sent by the same communication node.

On the basis of the preceding embodiments of the present application, a guard bandwidth between any two component carriers contiguous in the frequency domain of the at least two component carriers is used for transmitting the sensing signal.

The sensing signal occupies multiple component carriers in the frequency domain, and a guard bandwidth may be set between any two contiguous component carriers. The guard bandwidth may be a frequency domain resource between component carriers for preventing mutual signal interference, and the sensing signal can be transmitted using the frequency domain resource corresponding to the guard bandwidth. In an exemplary implementation, the guard bandwidth between any two contiguous component carriers occupied by the sensing signal in the frequency domain may be occupied by the sensing signal, or considered as the guard bandwidth set to 0.

On the basis of the preceding embodiments of the present application, transmitting the sensing signal and transmitting the communication signal in the at least two component carriers occupy different orthogonal frequency-division multiplexing (OFDM) symbols.

In the embodiment of the present application, orthogonal frequency-division multiplexing (OFDM) symbols occupied by the component carriers used by the sensing signal of the first transmission signal are different from OFDM symbols occupied by the communication signal of the first transmission signal, and any one of the OFDM symbols of the multiple component carriers used by the sensing signal is different from the OFDM symbols of the component carriers used by the communication signal of the first transmission signal.

On the basis of the preceding embodiments of the present application, transmitting the sensing signal and transmitting the communication signal in the at least two component carriers occupy different subcarriers of the same orthogonal frequency-division multiplexing symbol.

The sensing signal and the communication signal in the first transmission signal may occupy different subcarriers in the same OFDM symbol. For example, the sensing signal uses multiple component carriers, and the sensing signal and the communication signal may be transmitted simultaneously on one OFDM symbol in each component carrier. The sensing signal and the communication signal are located on different subcarriers of the OFDM symbol so that the frequency division of the communication signal and the sensing signal is achieved.

On the basis of the preceding embodiments of the present application, transmitting the sensing signal and transmitting the communication signal in the at least two component carriers occupy different beams.

In the embodiment of the present application, the beam of the component carrier where the sensing signal of the first transmission signal is located is different from the beam used for transmitting the communication signal. The preceding component carriers can only transmit the sensing signal, while the communication signal can be uploaded and transmitted in other beams. The relationship between the sensing signal and the communication signal in the first transmission signal may be space division multiplexing.

On the basis of the preceding embodiments of the present application, carrier aggregation (CA) of the sensing signal and carrier aggregation of the communication signal are independent of each other The carrier aggregation of the sensing signal in the first transmission signal and the carrier aggregation of the communication signal in the first transmission signal may be independent of each other, and the relationship between the communication signal and the sensing signal may be time division multiplexing, frequency division multiplexing or space division multiplexing. When carrier aggregation is performed on the sensing signal, the communication signal may use the same or different component carriers for carrier aggregation, or carrier aggregation may not be performed on the communication signal.

Figure 2:
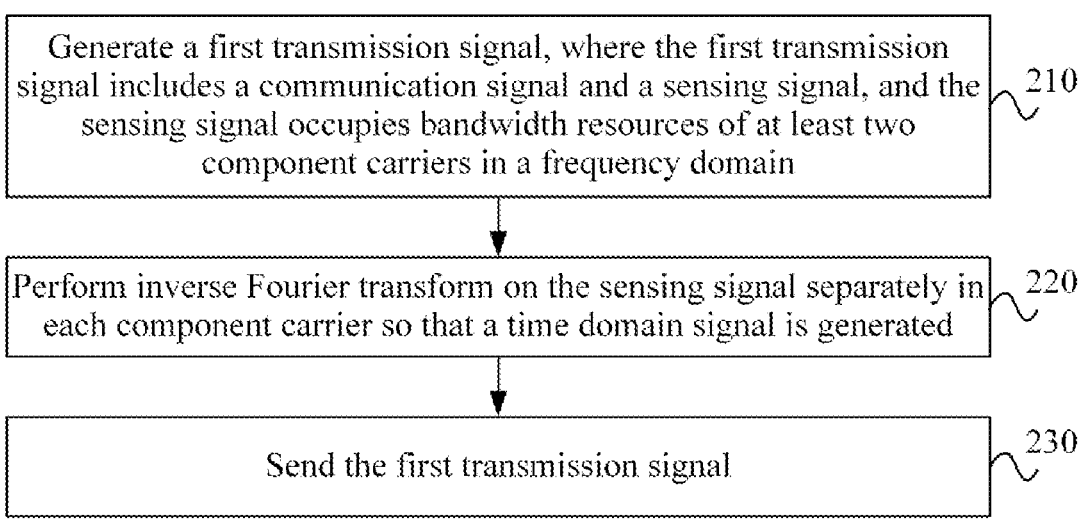
FIG. 2 is a flowchart of another signal sending method according to an embodiment of the present application.

FIG. 2 is a flowchart of another signal sending method according to an embodiment of the present application. The embodiment of the present application is described based on the preceding embodiments of the present application. Referring to FIG. 2, the method provided in the embodiment of the present application includes the following.

In 210, a first transmission signal is generated, where the first transmission signal includes a communication signal and a sensing signal, and the sensing signal occupies bandwidth resources of at least two component carriers in a frequency domain.

In 220, inverse Fourier transform is performed on the sensing signal separately in each component carrier so that a time domain signal is generated.

The inverse Fourier transform may be the process of reconstructing a signal from the frequency domain to the time domain. The time domain signal may be a signal that expresses the waveform changing over time, and the time domain signal may be a sensing signal in the time domain.

In the embodiment of the present application, inverse Fourier transform may be performed on the sensing signal separately in each component carrier so that the sensing signal is transformed into a time domain signal.

In 230, the first transmission signal is sent.

Figure 3:
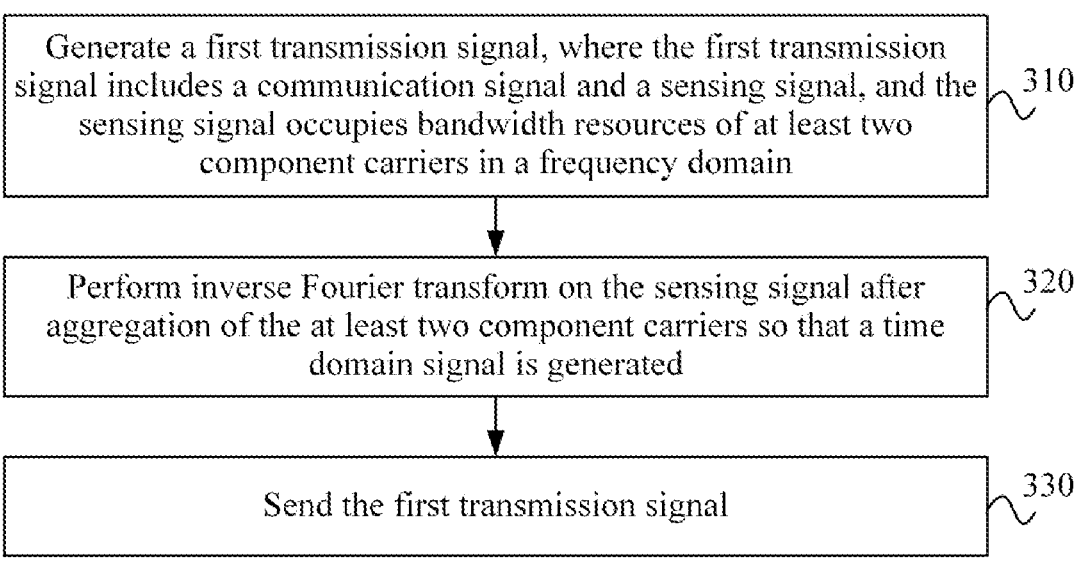
FIG. 3 is a flowchart of another signal sending method according to an embodiment of the present application.

FIG. 3 is a flowchart of another signal sending method according to an embodiment of the present application. The embodiment of the present application is described based on the preceding embodiments of the present application. Referring to FIG. 3, the method provided in the embodiment of the present application includes the following.

In 310, a first transmission signal is generated, where the first transmission signal includes a communication signal and a sensing signal, and the sensing signal occupies bandwidth resources of at least two component carriers in a frequency domain.

In 320, inverse Fourier transform is performed on the sensing signal after aggregation of the at least two component carriers so that a time domain signal is generated.

Carrier aggregation processing may be performed on multiple component carriers so that the bandwidth of the sensing signal is improved. After the aggregation of component carriers is completed, inverse Fourier transform may be performed on the sensing signal in the frequency domain generated by carrier aggregation so that the sensing signal is transformed into time domain information.

In 330, the first transmission signal is sent.

Figure 4:
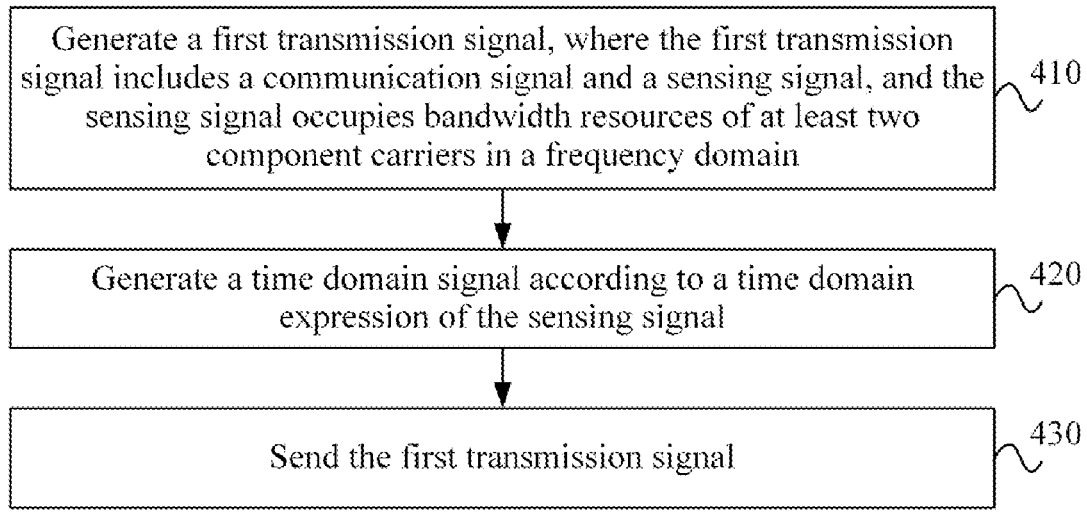
FIG. 4 is a flowchart of another signal sending method according to an embodiment of the present application.

FIG. 4 is a flowchart of another signal sending method according to an embodiment of the present application. The embodiment of the present application is described based on the preceding embodiments of the present application. Referring to FIG. 4, the method provided in the embodiment of the present application includes the following.

In 410, a first transmission signal is generated, where the first transmission signal includes a communication signal and a sensing signal, and the sensing signal occupies bandwidth resources of at least two component carriers in a frequency domain.

In S420, a time domain signal is generated according to a time domain expression of the sensing signal.

The time domain expression may be a function expression that reflects the waveform of the sensing signal in the time domain.

In the embodiment of the present application, a time domain expression may be acquired, and the sensing signal is transformed into a time domain signal according to the time domain expression.

In 430, the first transmission signal is sent.

On the basis of the preceding embodiments of the present application, the sensing signal includes at least one of: a frequency modulated continuous wave (FMCW)-based signal, a pulse-based signal or a low correlation sequence-based signal.

In the embodiment of the present application, the sensing signal may be a frequency modulated continuous wave (FMCW)-based signal, a pulse-based signal or a low correlation sequence-based signal. The FMCW-based signal may be a FMCW whose frequency changes over time according to the rule of the triangular wave. The pulse-based signal may be a discrete signal with periodic characteristics. The low correlation sequence-based signal may be a signal transmitted according to a sequence with low correlation.

On the basis of the preceding embodiments of the present application, the frequency modulated continuous wave-based signal includes at least one of: a sawtooth linear frequency modulation signal, a triangular linear frequency modulation signal or a segmental linear frequency modulation signal.

The sensing signal in the first transmission signal may include a sawtooth linear frequency modulation signal, a triangular linear frequency modulation signal or a segmental linear frequency modulation signal.

On the basis of the preceding embodiments of the present application, a relationship between the at least two component carriers includes at least one of: intra-band contiguous aggregation, intra-band non-contiguous aggregation or inter-band non-contiguous aggregation.

In the embodiment of the present application, multiple component carriers used by the sensing signal may be located within the same bandwidth and correspond to contiguous frequencies, or multiple component carriers may be located within the same bandwidth but correspond to non-contiguous frequencies, or multiple component carriers may be located within different bandwidths and correspond to non-contiguous frequencies.

On the basis of the preceding embodiments of the present application, the at least two component carriers have a maximum bandwidth limit and a minimum bandwidth limit.

The component carriers used by the sensing signal may have limits of the maximum bandwidth and the minimum bandwidth, and different maximum bandwidth limits and minimum bandwidth limits of these limits may be used for different subcarrier spacing.

Figure 5:
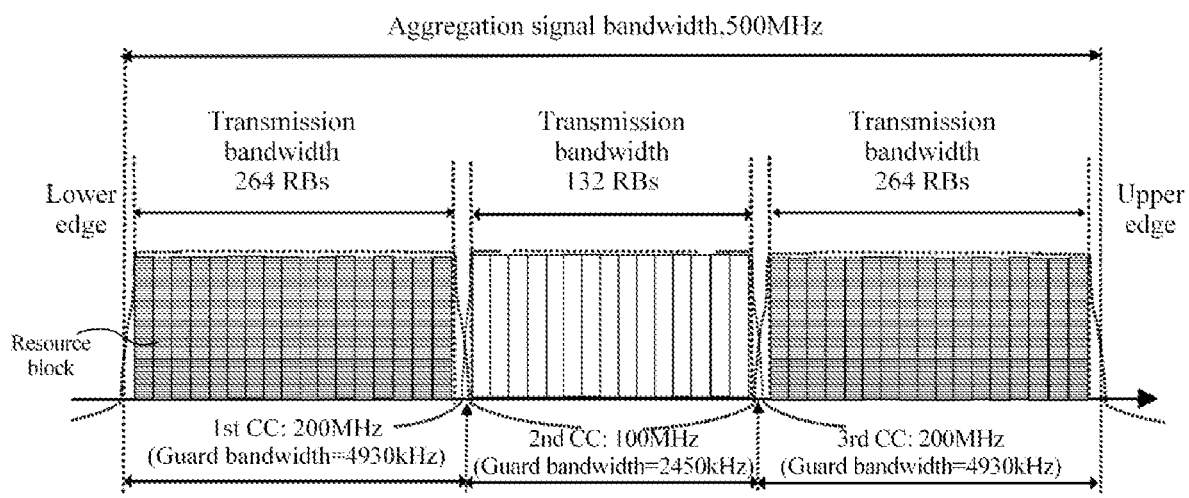
FIG. 5 is a schematic diagram of intra-band contiguous bandwidth carrier aggregation according to an embodiment of the present application.
Figure 6:
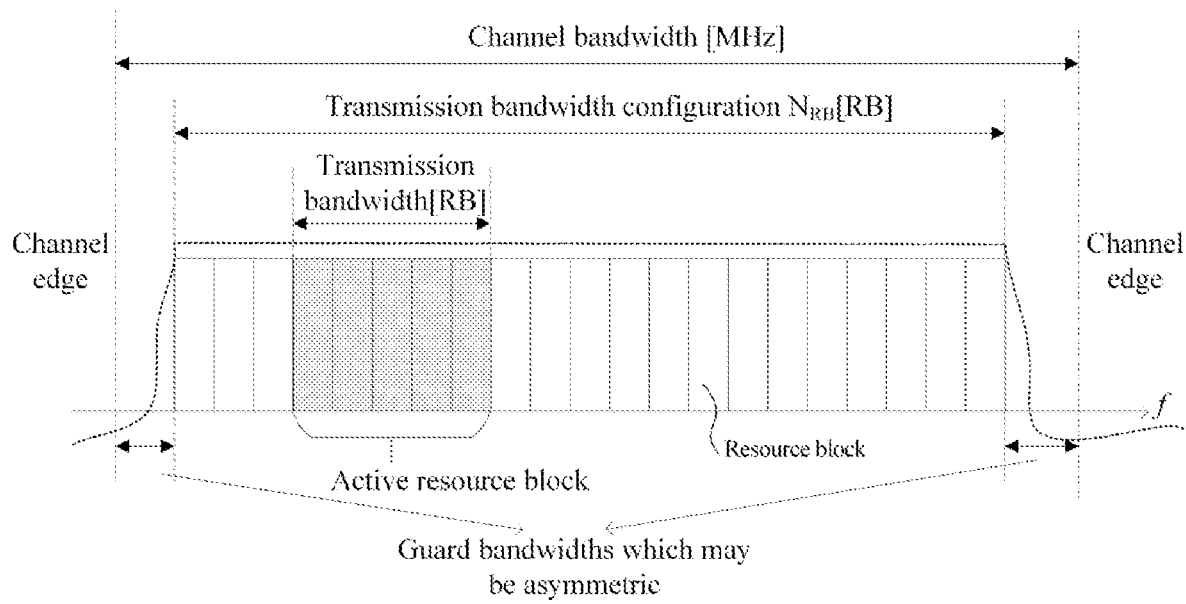
FIG. 6 is a schematic diagram of bandwidth parameters according to an embodiment of the present application.

In an exemplary implementation, the sensing signal of the first transmission signal may be transmitted in a manner of intra-band contiguous bandwidth carrier aggregation. FIG. 5 is a schematic diagram of intra-band contiguous bandwidth carrier aggregation according to an embodiment of the present application. The first transmission signal is within one symbol, the subcarrier spacing is 60 kHz, and aggregation of three subcarriers of 200 kHz, 100 kHz and 200 kHz is used, and the guard bandwidth between component carriers is not filled. Referring to FIG. 6, the subcarrier spacing $B_{SCS}$ satisfies that $B_{SCS}$=60 kHz, and no signal is sent on the guard bandwidth between component carriers (CC). The transmission bandwidth corresponding to the channel bandwidth of 200 MHz is 264 RBs, and guard bandwidths on two sides of the transmission bandwidth are each 4930 kHz. The transmission bandwidth corresponding to the channel bandwidth of 100 MHz is 132 RBs, and guard bandwidths on two sides of the transmission bandwidth are each 2450 kHz. FIG. 6 is a schematic diagram of bandwidth parameters according to an embodiment of the present application. Definitions of the channel bandwidth, the transmission bandwidth and the guard bandwidth can be illustrated referring to FIG. 6. In the embodiment, the sensing signal occupies the entire transmission bandwidth of an OFDM symbol, and the sensing signal may co-exist with the communication signal in the time division manner. For example, for multiple OFDM symbols in the time domain, some OFDM symbols carry the sensing signal, while some OFDM symbols carry the communication signal.

In the embodiment, multiple types of sensing signals may be synthesized through carrier aggregation. The sensing signal includes but not limited to the FMCW-based signal, the pulse-based signal or the low correlation sequence-based signal. The sensing signal being a Chirp signal is taken as an example for illustration here. The Chirp signal is an FMCW-based signal. The discrete form of the Chirp signal may be denoted as that $s[n]=\exp(j*\pi*K*(nT_S)^2)$, $n=0, 1, \ldots, N-1$, where j denotes a complex number, π denotes pi, K satisfies that K=B/T and denotes the Chirp rate, N denotes the number of sampling points, and $T_S$ denotes the sampling time. B denotes the bandwidth of the Chirp signal, T satisfies that $T=NT_S$ and denotes the duration of the Chirp signal, and for the subcarrier spacing of 60 KHz, T=1/60 ms. In this example, the guard bandwidth between CCs is not filled. The Chirp signal using carrier aggregation will use transmission bandwidths of three CCs. However, due to the fact that Chirp signals are usually contiguous in the frequency spectrum, this manner that does not occupy the guard bandwidth between CCs requires setting the data on the guard bandwidth to zero, causing some distortion. The impact of this distortion is very limited because compared to the transmission bandwidth, the guard interval occupies a very small bandwidth.

It is set that N=8166, and $B=NB_{SCS}$. Since it is known that T=1/60 ms, it can be obtained that $T_S$=B/T and K=B/T so that the discrete Chirp time domain signal s[n] is generated. The discrete Fourier transform is performed on s[n] and then a signal S[k] can be obtained. Finally, the first 264×15 numbers of the signal S[k] are used for filling each resource element (RE) in the 264 RBs bandwidth of the first CC. The middle 132×15 numbers are used for filling each RE in the 132 RBs bandwidth of the second CC. The last 264×15 numbers are used for filling each RE in the 264 RBs bandwidth of the third CC. At this time, transmission bandwidths in the three CCs are all filled, and the OFDM symbols subsequently generated according to the normal OFDM processing flow are the large-bandwidth sensing signal with minimal distortion. Frequency domain sequences of the first CC and the third CC are each padded with zeros to 4096 points, then the padded frequency domain sequence of the first CC and the padded frequency domain sequence of the third CC are transformed to the time domain through the 4096-point inverse fast Fourier transform (IFFT), so that the time domain sequence of the first CC and the time domain sequence of the third CC are obtained, and finally the time domain sequence of the first CC is mixed with a carrier frequency of the first CC to obtain a radio frequency signal of the first CC through a radio frequency (RF) mixer (that is, up conversion is performed on the time domain sequence of the first CC to move the time domain sequence of the first CC to a corresponding carrier frequency band), and the time domain sequence of the third CC is mixed with a carrier frequency of the third CC to obtain a radio frequency signal of the third CC through the RF mixer (that is, up conversion is performed on the time domain sequence of the third CC to move the time domain sequence of the third CC to a corresponding carrier frequency band), where the frequency domain sequence and the time domain sequence are also referred to as a baseband signal. The frequency domain sequence of the second CC is padded with zeros to 2048 points, then the padded frequency domain sequence of the second CC is transformed to the time domain through the 2048-point IFFT, so that the time domain sequence of the second CC is obtained, and finally the time domain sequence of the second CC is mixed with a carrier frequency of the second CC to obtain a radio frequency signal of the second CC through a RF mixer (that is, up conversion is performed on the time domain sequence of the second CC to move the time domain sequence of the second CC to a corresponding carrier frequency band). For any one of the first CC, the second CC, and the third CC, as contiguous bandwidths are aggregated, the baseband signal of any CC may be oversampled, frequency-shifted to the same carrier frequency by using a digital processing, and then mixed with this carrier frequency to obtain a radio RF signal of the CC. In addition, since the sensing signal does not need to be frequently changed, the time domain sequence of the sensing signal can be saved after the sensing signal is calculated and generated in one time, and then the sensing signal is transmitted for multiple times.

Figure 7:
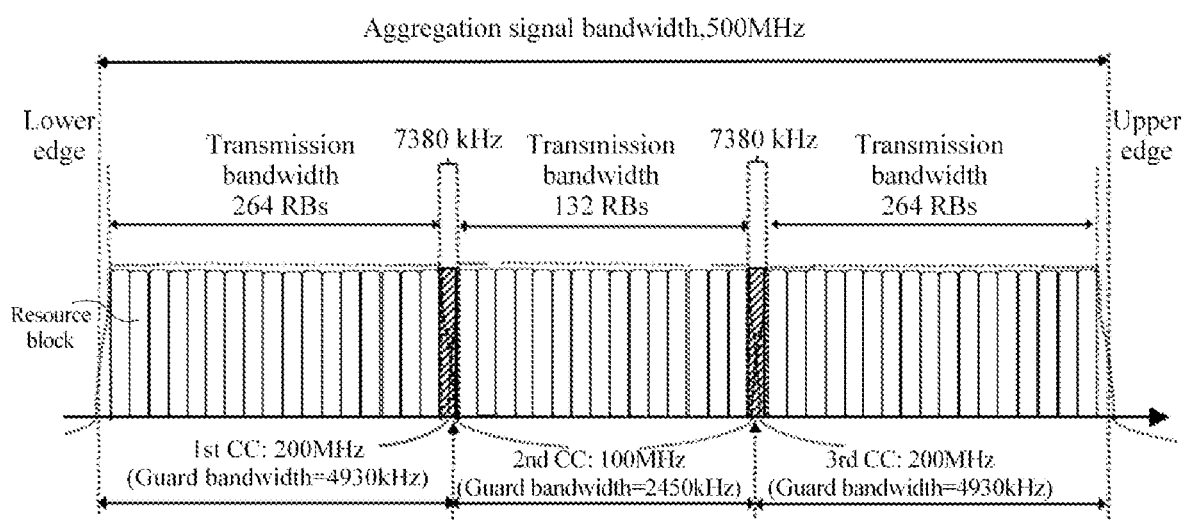
FIG. 7 is a schematic diagram of intra-band contiguous bandwidth carrier aggregation according to an embodiment of the present application.

In an exemplary implementation, the sensing signal of the first transmission signal may be transmitted in a manner of intra-band contiguous bandwidth carrier aggregation. FIG. 7 is a schematic diagram of intra-band contiguous bandwidth carrier aggregation according to an embodiment of the present application. In the embodiment of the present application, the subcarrier spacing of the first transmission signal is 60 kHz, using intra-band contiguous bandwidths and using aggregation of three carriers of 200 MHz, 100 MHz and 200 MHz. As shown in FIG. 7, the subcarrier spacing $B_{SCS}$ of the first transmission signal satisfies that $B_{SCS}$=60 kHz, and signal transmission is performed on the guard bandwidth between CCs. The transmission bandwidth corresponding to the channel bandwidth of 200 MHz is 264 RBs, and guard bandwidths on two sides of the transmission bandwidth are each 4930 kHz. The transmission bandwidth corresponding to the channel bandwidth of 100 MHz is 132 RBs, and guard bandwidths on two sides of the transmission bandwidth are each 2450 kHz. For definitions of the channel bandwidth, the transmission bandwidth and the guard bandwidth, reference may be made to FIG. 6. In the embodiment, the sensing signal occupies the entire transmission bandwidth of an OFDM symbol, and the sensing signal may co-exist with the communication signal in the space division manner. At this time, the transmitting terminal should have multiple transmitting antennas so that the sensing signal can be transmitted on some beams and the communication signal can be transmitted on some beams.

In the embodiment, multiple types of sensing signals may be synthesized through carrier aggregation. The sensing signal includes but not limited to the FMCW-based signal, the pulse-based signal or the low correlation sequence-based signal. The sensing signal being a triangular linear frequency modulation signal is taken as an example for illustration here. The triangular linear frequency modulation signal is an FMCW-based signal. The discrete form of the triangular linear frequency modulation signal may be denoted as that $s[n]=\exp(j*\pi*K*(nT_S)^2)$, where n=0, 1, . . . , N/2−1; $s[n]=\exp(j*\pi*K*((N-n-1)T_S)^2)$, where n=N/2, . . . , N−1. j denotes a complex number, π denotes pi, K satisfies that K=2B/T and denotes the Chirp rate. The triangular linear frequency modulation signal includes two Chirp signals, so the duration of one Chirp is changed to T/2, the bandwidth B remains unchanged, N is a positive even number and denotes the number of sampling points, and $T_S$ denotes the sampling time. B denotes the bandwidth of the Chirp signal, T satisfies that T=$NT_S$ and denotes the duration of the triangular linear frequency modulation signal, and for the subcarrier spacing of 60 KHz, T=1/60 ms. In this example, filling the guard bandwidth between CCs can eliminate the small distortion introduced for protocol continuity. At this time, the Chirp signal using carrier aggregation will use three transmission signal bandwidths and the guard bandwidth between CCs. The receiving terminal can process signals on three CC bandwidths as one time domain signal, so that the impact of occupying the guard bandwidth can be eliminated at the receiving terminal.

It is set that the sampling point N satisfies that N=8166, and the bandwidth B satisfies that B=$NB_{SCS}$. Since it is known that T=1/60 ms, it can be obtained that $T_S$=B/T and K=2B/T so that the triangular linear frequency modulation signal s[n] is generated. The discrete Fourier transform is performed on s[n] and then S[k] can be obtained. Finally, numbers in S[k] are used for sequentially filling each RE in the 264 RBs bandwidth of the first CC, each RE in the 4930 kHz+2450 kHz guard bandwidth between the first CC and the second CC, each RE in the 132 RBs bandwidth of the second CC, each RE in the 4930 kHz+2450 kHz guard bandwidth between the second CC and the third CC and each RE in the 264 RBs bandwidth of the third CC. The RE within the guard bandwidth between CCs needs to be allocated to the adjacent CC for processing, which is equivalent to lengthening the frequency domain sequence of the CC. Frequency domain sequences of the first CC and the third CC are each padded with zeros to 4096 points, then the padded frequency domain sequence of the first CC and the padded frequency domain sequence of the third CC are transformed to the time domain through the 4096-point IFFT, so that the time domain sequence of the first CC and the time domain sequence of the third CC are obtained, and finally the time domain sequence of the first CC is mixed with a carrier frequency of the first CC to obtain a radio frequency signal of the first CC through an intermediate frequency (IF) mixer (that is, up conversion is performed on the time domain sequence of the first CC to move the time domain sequence of the first CC to a corresponding carrier frequency band), and the time domain sequence of the third CC is mixed with a carrier frequency of the third CC to obtain a radio frequency signal of the third CC through the IF mixer (that is, up conversion is performed on the time domain sequence of the third CC to move the time domain sequence of the third CC to a corresponding carrier frequency band). The frequency domain sequence of the second CC is padded with zeros to 2048 points, then the padded frequency domain sequence of the second CC is transformed to the time domain through the 2048-point IFFT, so that the time domain sequence of the second CC is obtained, and finally the time domain sequence of the second CC is mixed with a carrier frequency of the second CC to obtain a radio frequency signal of the second CC through a radio frequency (RF) mixer (that is, up conversion is performed on the time domain sequence of the second CC to move the time domain sequence of the second CC to a corresponding carrier frequency band), and the RF signal of the second CC is then transmitted. In another processing manner, the signal S[k] occupies N REs in the frequency domain, where N=8166, and the unified IFFT processing is performed on the signal S[k]. First, the signal S[k] is padded with zeros to M points, and the padded signal is transformed to the time domain through the M-point IFFT to obtain a time domain signal, where M is larger than or equal to N. When M=N, it is meant that zero padding is not performed. When M=8192, the 4096-point IFFT calculation can be reused. Finally, up conversion is performed by the RF mixer on the time domain signal, so that the time domain signal is moved to the corresponding carrier frequency band. In addition, since the sensing signal does not need to be frequently changed, the time domain sequence of the sensing signal can be saved after the sensing signal is calculated and generated in one time, and then the sensing signal is transmitted for multiple times.

In the embodiment, the guard bandwidth between CCs is also utilized, and thus the frequency band and the band CCs is contiguous in the frequency domain, so corresponding baseband transmission signals can also be directly generated in the time domain. The manner is described below. The triangular linear frequency modulation signal is still taken as an example. For the time domain transmission sequence s[n] mentioned earlier, it is set that N=8166, T=1/60 ms, B=489.96 MHz, and the time domain baseband signal is directly generated. The result of this manner is the same as the result of the frequency domain generation manner using the 8166-point IFFT. Finally, up conversion is performed on the time domain baseband signal so that the time domain baseband signal is moved to the corresponding carrier frequency band.

Figure 8:
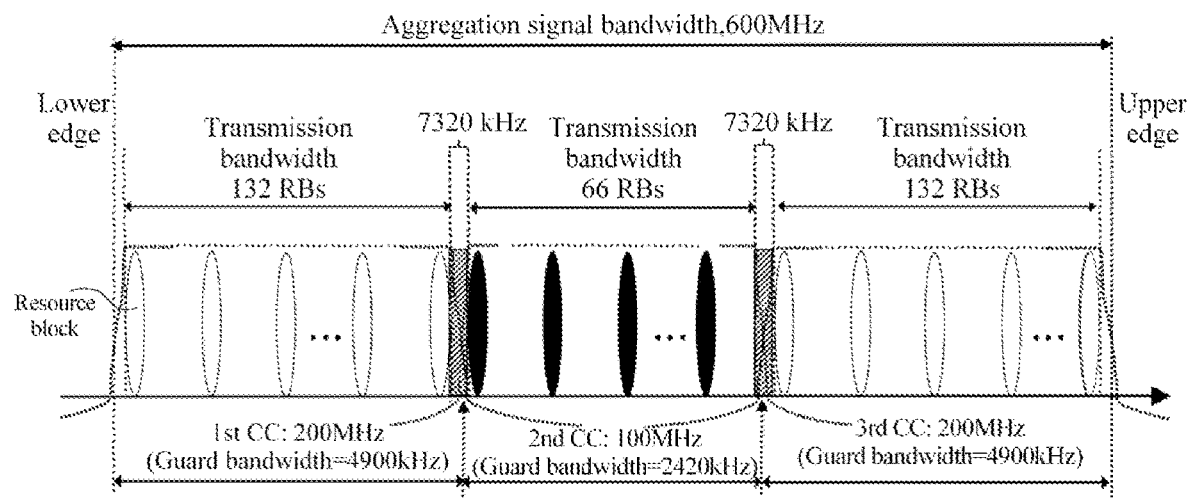
FIG. 8 is a schematic diagram of intra-band contiguous bandwidth carrier aggregation according to an embodiment of the present application.

In an exemplary implementation, the sensing signal of the first transmission signal may be transmitted in a manner of intra-band contiguous bandwidth carrier aggregation. FIG. 8 is a schematic diagram of intra-band contiguous bandwidth carrier aggregation according to an embodiment of the present application. The subcarrier spacing of the first transmission signal is 120 kHz, using intra-band contiguous bandwidths and using aggregation of three subcarriers of 200 MHz, 100 MHz and 200 MHz. Referring to FIG. 8, the subcarrier spacing $B_{SCS}$ in the first transmission signal satisfies that $B_{SCS}$=120 kHz, and no signal is sent on the guard bandwidth between CCs. The transmission bandwidth corresponding to the channel bandwidth of 200 MHz is 132 RBs, and guard bandwidths on two sides of the transmission bandwidth are each 4900 kHz. The transmission bandwidth corresponding to the channel bandwidth of 100 MHz is 66 RBs, and guard bandwidths on two sides of the transmission bandwidth are each 2420 kHz. For definitions of the channel bandwidth, the transmission bandwidth and the guard bandwidth, reference may be made to FIG. 6. In the embodiment, the signal of integrated sensing and communication is in frequency division and will be described below in detail.

In the embodiment, multiple types of sensing signals may be synthesized through carrier aggregation. The sensing signal includes but not limited to the FMCW-based signal, the pulse-based signal or the low correlation sequence-based signal. Here, two sawtooth linear frequency modulation signals are taken as an example for illustration here. The sawtooth linear frequency modulation signal is an FMCW-based signal. The discrete form of the sawtooth linear frequency modulation signal may be denoted as that s[n] =exp(j*π*K*(nT$_S$)$^2$), where n mod N/2=0, 1, ..., ceil(3N/8)−1; s[n]=0, where n mod N/2=ceil(3N/8), ..., N/2−1. The value of n ranges from 0 to N−1, j denotes a complex number, π denotes pi, K satisfies that K=8B/3T and denotes the Chirp rate (the duration of one Chirp is changed to 3T/8, while the bandwidth B remains unchanged.), N denotes the number of sampling points, and T$_S$ denotes the sampling time. B denotes the bandwidth of the Chirp signal, T satisfies that T=NT$_S$ and denotes the duration of two sawtooth linear frequency modulation signals, and for the subcarrier spacing of 120 KHz, T=1/120 ms. In the example, the guard bandwidth between CCs is not filled, so that the continuity of the protocol can be maintained. Moreover, in this example, the sensing signal and data are transmitted in the same OFDM symbol, so that preserving the guard bandwidth is to reduce the interference of data transmission. The Chirp signal using carrier aggregation will use transmission bandwidths of three CCs. However, due to the fact that Chirp signals are usually contiguous in the frequency spectrum, this manner that does not occupy the guard bandwidth between CCs requires setting the data on the guard bandwidth to zero, causing some distortion. The impact of this distortion is very limited because compared to the transmission bandwidth, the guard interval occupies a very small bandwidth.

It is set that the sampling point N satisfies that N=4204, and the bandwidth B satisfies that B=NB$_{SCS}$. Since it is known that T=1/120 ms, it can be obtained that T$_S$=B/T and K=B/T so that two sawtooth linear frequency modulation signals s[n] are generated. Since the transmitted signal is repetitive in the time domain, the frequency domain sequence of the IFFT corresponding to the transmitted signal is sparse, with 0 periodically appearing, as shown in FIG. 8. For the example of two sawtooth linear frequency modulation signals, the repetition of the two sawtooth linear frequency modulation signals results in one 0 appearing at the second position of every two points in the frequency domain. This position where 0 appears can be used for data transmission. Therefore, the discrete Fourier transform is performed on s[n], the obtained S[k] is sparse, and the first 132×12 numbers of the sparse S [k] are used for filling each RE in the 132 RBs bandwidth in the first CC; the middle 66×12 numbers are used for filling each RE in the 66 RBs bandwidth of the second CC; the last 132×12 numbers are used for filling each RE in the 132 RBs bandwidth of the third CC. At this time, transmission bandwidths of the three CCs are filled with some subcarriers, and subcarriers not used by the sensing signal can be used for transmitting the communication signal. The OFDM symbols generated according to the normal OFDM processing flow are the large-bandwidth sensing signal with minimal distortion. Frequency domain sequences of the first CC and the third CC are each padded with zeros to 2048 points, then the padded frequency domain sequence of the first CC and the padded frequency domain sequence of the third CC are transformed to the time domain through the 2048-point IFFT, so that the time domain sequence of the first CC and the time domain sequence of the third CC are obtained, and finally the time domain sequence of the first CC is mixed with a carrier frequency of the first CC to obtain a radio frequency signal of the first CC through an intermediate frequency (IF) mixer (that is, up conversion is performed on the time domain sequence of the first CC to move the time domain sequence of the first CC to a corresponding carrier frequency band), and the time domain sequence of the third CC is mixed with a carrier frequency of the third CC to obtain a radio frequency signal of the third CC through the IF mixer (that is, up conversion is performed on the time domain sequence of the third CC to move the time domain sequence of the third CC to a corresponding carrier frequency band). The frequency domain sequence of the second CC is padded with zeros to 1024 points, then the padded frequency domain sequence of the second CC is transformed to the time domain through the 1024-point IFFT, so that the time domain sequence of the second CC is obtained, and finally the time domain sequence of the second CC is mixed with a carrier frequency of the second CC to obtain a radio frequency signal of the second CC through a RF mixer (that is, up conversion is performed on the time domain sequence of the second CC to move the time domain sequence of the second CC to a corresponding carrier frequency band). In addition, since the sensing signal does not need to be frequently changed, the time domain sequence of the sensing signal can be saved after the sensing signal is calculated and generated in one time, and the sensing signal is superposed in the time domain to data not used for subcarrier filling, and then is mixed and transmitted.

Figure 9:
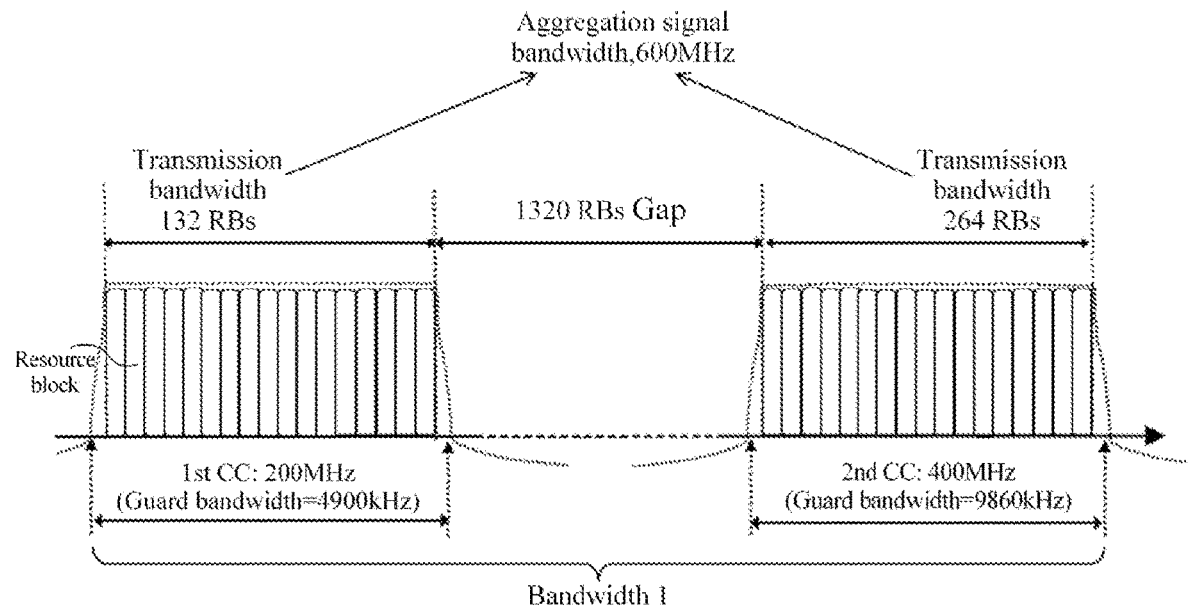
FIG. 9 is a schematic diagram of intra-band non-contiguous bandwidth carrier aggregation according to an embodiment of the present application.
Figure 10:
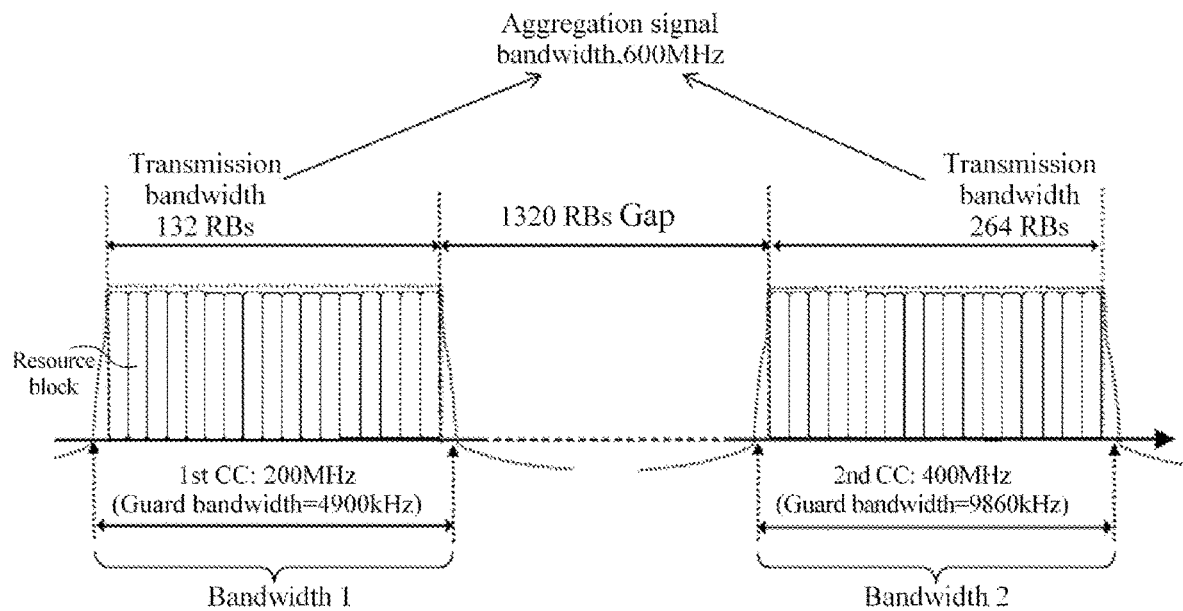
FIG. 10 is a schematic diagram of inter-band non-contiguous bandwidth carrier aggregation according to an embodiment of the present application.

In an exemplary implementation, the first transmission signal is the aggregation of two carriers of 200 MHz+400 MHz. Referring to FIG. 9 and FIG. 10, the first transmission signal separately uses intra-band non-contiguous bandwidths and inter-band non-contiguous bandwidths. The first transmission signal may be generated through carrier aggregation of intra-band non-contiguous bandwidths or carrier aggregation of inter-band non-contiguous bandwidths, where the subcarrier spacing $B_{SCS}$ satisfies that $B_{SCS}$=120 kHz, and no signal is sent on the guard bandwidth between CCs. The transmission bandwidth corresponding to the channel bandwidth of 200 MHz is 132 RBs, and guard bandwidths on two sides of the transmission bandwidth are each 4900 kHz. The transmission bandwidth corresponding to the channel bandwidth of 400 MHz is 264 RBs, and guard bandwidths on two sides of the transmission bandwidth are each 9860 kHz. For definitions of the channel bandwidth, the transmission bandwidth and the guard bandwidth, reference may be made to FIG. 6. In the embodiment, the sensing signal occupies the entire transmission bandwidth of an OFDM symbol, and thus the sensing signal may co-exist with the communication signal in the time division manner. For example, for multiple OFDM symbols in the time domain, some OFDM symbols carry the sensing signal, while some OFDM symbols carry the communication signal.

Figure 11:
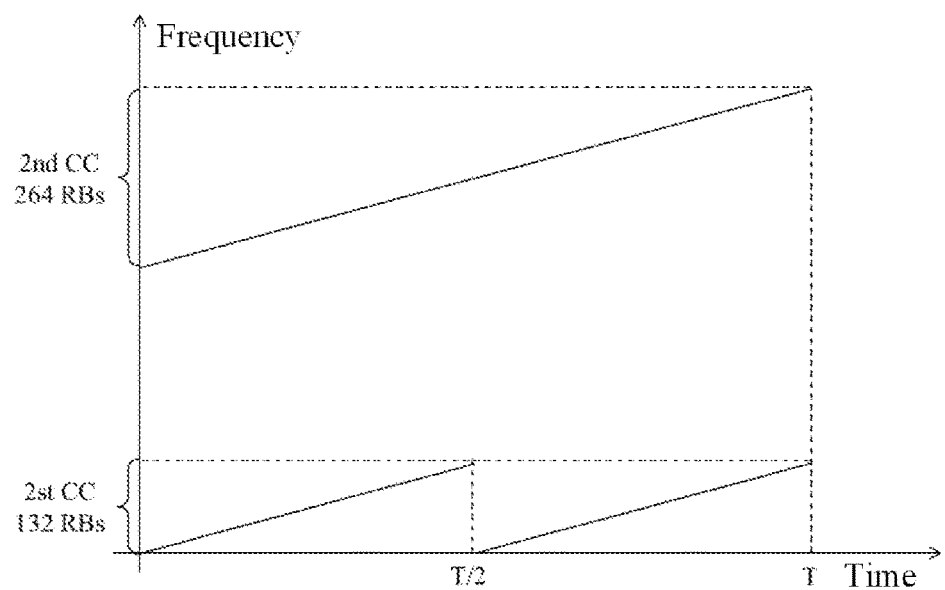
FIG. 11 is a schematic diagram of the effect of inter-band non-contiguous bandwidth carrier aggregation according to an embodiment of the present application.

In the embodiment, a sensing signal is generate by using non-contiguous bandwidths. Although non-contiguous bandwidths are more difficult to utilize than contiguous bandwidths, the embodiment of the present application does not rule out the possibility of utilizing non-contiguous bandwidths. One implementation is that two sensing signals are generated by using two bandwidths in the non-contiguous bandwidths respectively, and the two sensing signals are associated with each other (in other words, the two sensing signals are not independent and can complement each other). For better understanding, the two sensing signal are referred to as a first sensing signal and a second sensing signal which are two parts of an identical sensing signal. For example, the Chirp signal is taken as an example for illustration in the frequency domain here. Two Chirp signals with the bandwidth of 132 RBs and the slope of K are generated on the first CC, and a Chirp signal with the bandwidth of 264 RBs and the slope of K is generated on the second CC, as shown in FIG. 11. In this manner, detection ranges of the two Chirp signals are not the same. The range of the first CC may be roughly determined through the preliminary result of the second CC, an appropriate Chirp signal is selected to be mixed with the first CC, and the two results are ultimately combined so that a better detection signal-to-noise ratio is obtained.

Figure 12:
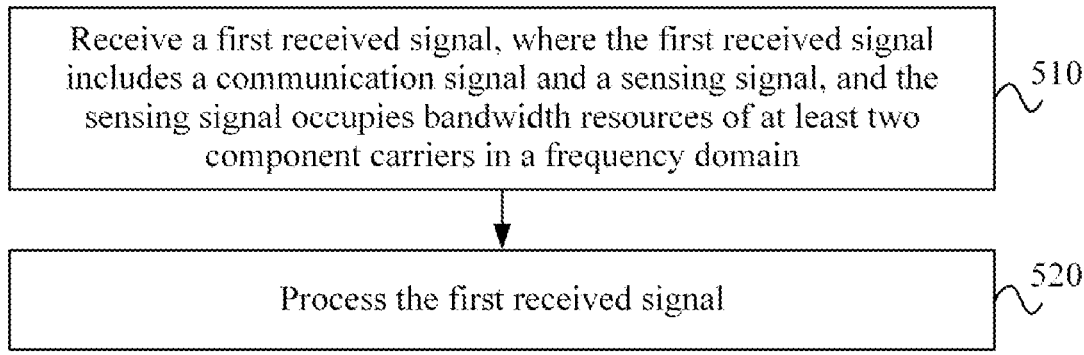
FIG. 12 is a flowchart of a signal receiving method according to an embodiment of the present application.

FIG. 12 is a flowchart of a signal receiving method according to an embodiment of the present application. The embodiment of the present application is applicable to receiving signals of integrated sensing and communication. The method may be performed by an information receiving apparatus. The apparatus may be implemented by software and/or hardware. Referring to FIG. 12, the method provided in the embodiment of the present application includes the following.

In 510: A first received signal is received, where the first received signal includes a communication signal and a sensing signal, and the sensing signal occupies bandwidth resources of at least two component carriers in a frequency domain.

The first received signal may be a received signal of integrated sensing and communication, and the first received signal may simultaneously have functions of both the communication signal and the sensing signal. The first received signal may actively recognize and analyze characteristics of a radio channel while transmitting information on the radio channel, thereby sensing physical characteristics of the surrounding environment and achieving the sensing function. The sensing signal may be a signal used for sensing the physical characteristics of the surrounding environment, and may be a component of the first received signal. The sensing signal may be generated through carrier aggregation. The sensing signal may occupy bandwidth resources composed of at least two component carriers. A component carrier may be a signal wave used for carrying signal transmission, and may be an electromagnetic wave such as a radio wave, a microwave, infrared rays, visible light, ultraviolet rays, etc. The bandwidth resource may be the minimum signal bandwidth occupied by the sensing signal.

In the embodiment of the present application, the first received signal of integrated sensing and communication may be received. The first received signal may include a communication signal with the communication function and a sensing signal with the sensing function. The sensing signal may be generated through carrier aggregation, and in the frequency domain, the sensing signal may occupy bandwidth resources of at least two carriers.

In 520, the first received signal is processed.

The first received signal may be processed so that communication data in the communication signal and sensing data in the sensing signal are acquired. Processing of the first received signal may include simultaneously processing the communication signal and the sensing signal, or separating the first received signal into the communication signal and the sensing information and then separately processing the communication signal and the sensing signal.

In the embodiment of the present application, the first received signal including the communication signal and the sensing signal is received, where the sensing signal occupies bandwidth resources of at least two component carriers in the frequency domain, and the received first received signal is processed. In this manner, the reception of sensing data in the signal of integrated sensing and communication is implemented, the transmission bandwidth of the sensing data is increased, and thus the accuracy of sensing data transmission can be improved.

On the basis of the preceding embodiments of the present application, the at least two component carriers are sent by the same communication node.

On the basis of the preceding embodiments of the present application, a guard bandwidth between any two component carriers contiguous in the frequency domain of the at least two component carriers is used for transmitting the sensing signal.

On the basis of the preceding embodiments of the present application, transmitting the sensing signal and transmitting the communication signal in the at least two component carriers occupy different OFDM symbols.

On the basis of the preceding embodiments of the present application, transmitting the sensing signal and transmitting the communication signal in the at least two component carriers occupy different subcarriers of the same OFDM symbol.

On the basis of the preceding embodiments of the present application, transmitting the sensing signal and transmitting the communication signal in the at least two component carriers occupy different beams.

On the basis of the preceding embodiments of the present application, carrier aggregation of the sensing signal and carrier aggregation of the communication signal are independent of each other On the basis of the preceding embodiments of the present application, at least one of the following may be included. A time domain signal is generated by performing inverse Fourier transform on the sensing signal in each component carrier; a time domain signal is generated by performing inverse Fourier transform on the sensing signal after aggregation of the at least two component carriers; or a time domain signal is generated according to a time domain expression of the sensing signal.

On the basis of the preceding embodiments of the present application, the sensing signal includes at least one of: a frequency modulated continuous wave-based signal, a pulse-based signal or a low correlation sequence-based signal.

On the basis of the preceding embodiments of the present application, the frequency modulated continuous wave-based signal includes at least one of: a sawtooth linear frequency modulation signal, a triangular linear frequency modulation signal or a segmental linear frequency modulation signal.

On the basis of the preceding embodiments of the present application, a relationship between the at least two component carriers includes at least one of: intra-band contiguous aggregation, intra-band non-contiguous aggregation or inter-band non-contiguous aggregation.

On the basis of the preceding embodiments of the present application, the at least two component carriers have a maximum bandwidth limit and a minimum bandwidth limit.

Figure 13:
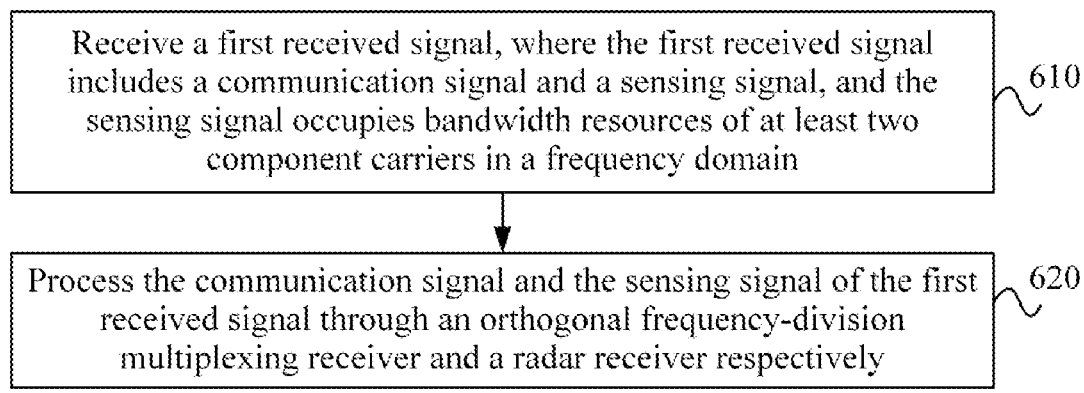
FIG. 13 is a flowchart of another signal receiving method according to an embodiment of the present application.

FIG. 13 is a flowchart of another signal receiving method according to an embodiment of the present application. The embodiment of the present application is described based on the preceding embodiments of the present application. Referring to FIG. 13, the method provided in the embodiment of the present application includes the following.

In 610, a first received signal is received, where the first received signal includes a communication signal and a sensing signal, and the sensing signal occupies bandwidth resources of at least two component carriers in a frequency domain.

In 620, the communication signal and the sensing signal of the first received signal are processed through an orthogonal frequency-division multiplexing receiver and a radar receiver respectively.

In the embodiment of the present application, the communication signal and the sensing signal in the first received signal may be processed separately. The first received signal may be sent to the orthogonal frequency-division multiplexing receiver, and the orthogonal frequency-division multiplexing receiver processes the communication signal in the first received signal. The first received signal may be sent to the radar receiver, and the radar receiver processes the sensing signal.

On the basis of the preceding embodiments of the present application, processing the sensing signal of the first received signal through the radar receiver includes the following. Carrier mixing is performed on the first received signal so that a baseband signal is acquired; and two-dimensional (2D) Fourier transform is performed on the baseband signal.

Carrier mixing may be the process of mixing component carriers of different frequencies to obtain signals of other frequencies, and the baseband signal may be the native frequency band of the original signal at the source. The two-dimensional Fourier transform is a processing process that can convert a time domain signal to a frequency domain signal.

The first received signal may be processed through the radar receiver. Carrier mixing may be performed on the first received signal using multiple component carriers so that the original baseband signal is acquired. The two-dimensional Fourier transform may be performed on the acquired baseband signal so that the baseband signal is transformed from a time domain signal to a frequency domain signal.

On the basis of the preceding embodiments of the present application, processing the sensing signal of the first received signal through the radar receiver includes the following. Carrier mixing is performed on the first received signal so that a baseband signal is acquired; fast Fourier transform is performed on the baseband signal and the sensing signal is acquired; and the sensing signal is processed in the frequency domain.

The first received signal may be processed through the radar receiver. Carrier mixing may be performed on the first received signal using multiple component carriers so that the original baseband signal is acquired. The fast Fourier transform may be performed on the original baseband signal so that the baseband signal is transformed into a frequency domain signal. The sensing signal may be extracted from the baseband signal, and the sensing signal is processed in the frequency domain.

On the basis of the preceding embodiments of the present application, processing the sensing signal of the first received signal through the radar receiver includes the following. Carrier mixing is performed on the first received signal so that a baseband signal is acquired; and sequence correlation is performed on the first received signal or the baseband signal, and detection is performed according to a correlation peak of the sequence correlation.

In the embodiment of the present application, the radar receiver performs carrier mixing on the first received signal to obtain the baseband signal, performs the sequence correlation on the baseband signal, and then can perform detection according to the correlation peak.

Figure 14:
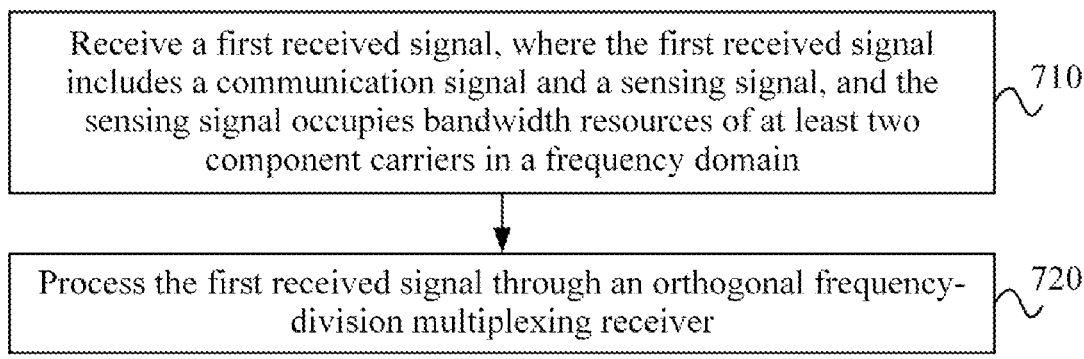
FIG. 14 is a flowchart of another signal receiving method according to an embodiment of the present application.

FIG. 14 is a flowchart of another signal receiving method according to an embodiment of the present application. The embodiment of the present application is described based on the preceding embodiments of the present application. Referring to FIG. 14, the method provided in the embodiment of the present application includes the following.

In 710, a first received signal is received, where the first received signal includes a communication signal and a sensing signal, and the sensing signal occupies bandwidth resources of at least two component carriers in a frequency domain.

In 720, the first received signal is processed through an orthogonal frequency-division multiplexing receiver.

In the embodiment of the present application, the first received signal may be directly processed through the orthogonal frequency-division multiplexing receiver without separating the communication signal and the sensing signal in the first received signal. The first received signal is directly processed through the orthogonal frequency-division multiplexing receiver.

On the basis of the preceding embodiments of the present application, processing the first received signal through the orthogonal frequency-division multiplexing receiver includes the following. Fast Fourier transform is performed on the first received signal so that the communication signal and the sensing signal are separated; and time domain processing is performed after frequency domain processing is performed on the sensing signal or inverse Fourier transform is performed on the sensing signal.

In the embodiment of the present application, the fast Fourier transform may be performed in the orthogonal frequency-division multiplexing receiver so that the first received signal is transformed from a time domain signal to a frequency domain signal, then the first received signal in the frequency domain is separated into the communication signal and the sensing signal, the inverse Fourier transform may be performed on the extracted sensing signal so that the sensing signal is transformed from a frequency domain signal to a time domain signal, and the extracted sensing signal is processed in the time domain.

Figure 15:
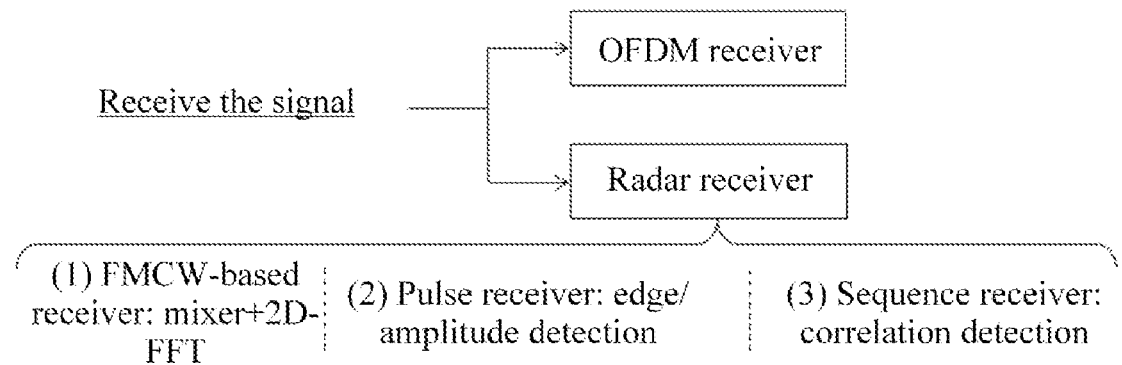
FIG. 15 is a schematic diagram of processing a first received signal according to an embodiment of the present application.
Figure 16:
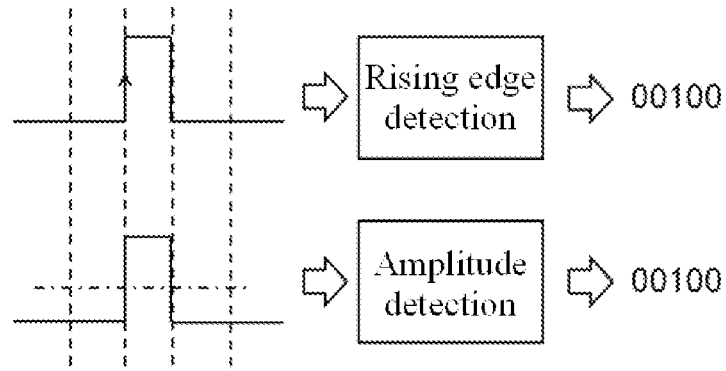
FIG. 16 is a schematic diagram of pulse signal detection according to an embodiment of the present application.
Figure 17:
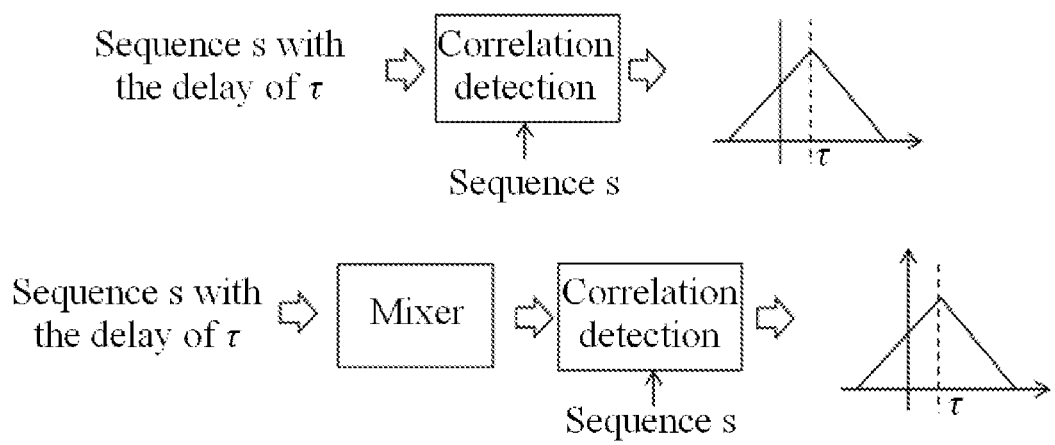
FIG. 17 is a schematic diagram of detecting correlation sequence detection according to an embodiment of the present application.
Figure 18:
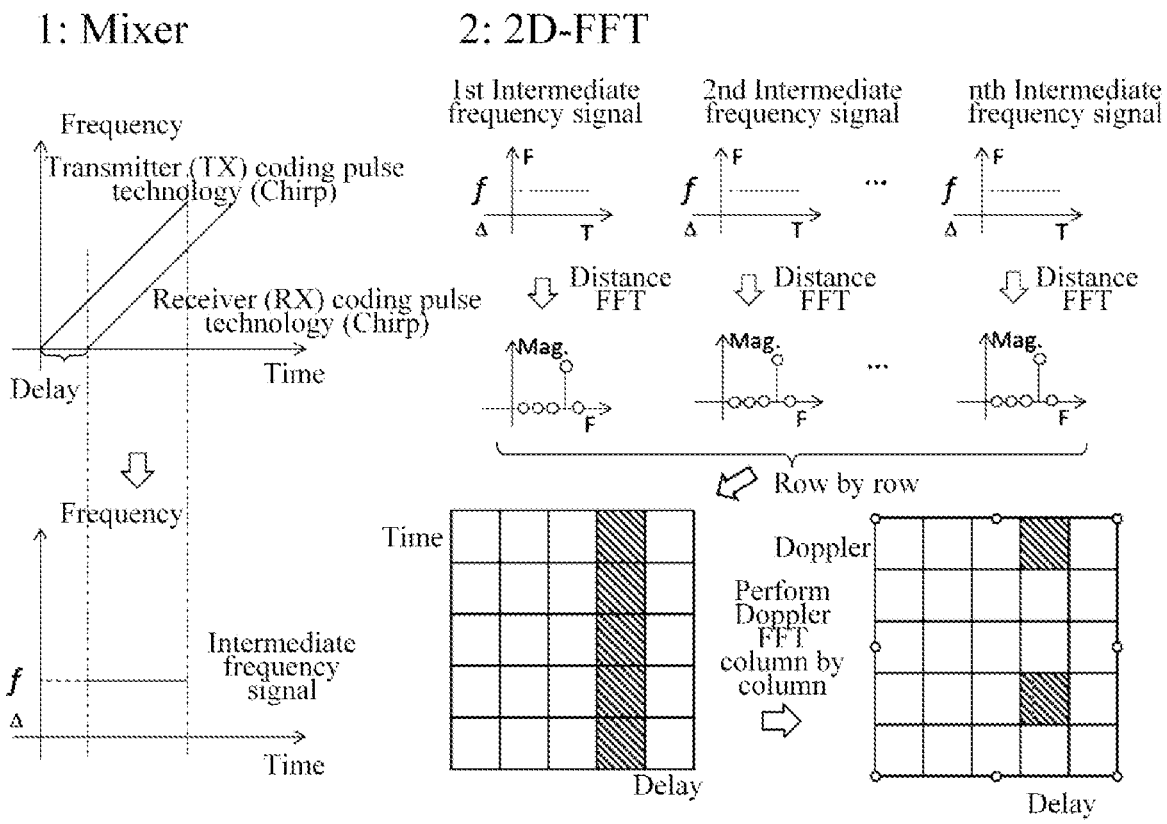
FIG. 18 is a schematic diagram of processing a frequency modulated continuous wave (FMCW)-based signal according to an embodiment of the present application.

In an exemplary implementation, FIG. 15 is a schematic diagram of processing a first received signal according to an embodiment of the present application. Referring to FIG. 15, the sensing signal being an FMCW-based signal is taken as an example. In the embodiment of the present application, carrier aggregation signals based on integrated sensing and communication may be detected separately through a communication receiver and a sensing receiver. The received signal is directly sent to an OFDM receiver and a radar receiver simultaneously. The OFDM receiver is used for processing the communication signal, and the radar receiver is used for processing the sensing signal. Radar receivers may be divided into three types described below according to the waveform of the transmitted sensing signal. (1) The radar receiver may be an FMCW-based receiver mainly used for performing a mixing processing, or a de-chirping processing, or a 2D-FFT processing at the receiving terminal. (2) The radar receiver may be a pulse-based receiver mainly used for performing edge detection or amplitude detection on the received signal. The edge detection in the embodiment of the present application may include rising edge detection or falling edge detection. Referring to FIG. 16, in the embodiment of the present application, the rising edge of the pulse signal may be detected. When a rising edge exists in the pulse signal, the signal value of the pulse signal may be 1; when no rising edge exists in the pulse signal, the signal value of the pulse signal may be 0. In the embodiment of the present application, the amplitude of the pulse signal may also be detected. When a high amplitude exists in the pulse signal, the signal value of the pulse signal may be 1; when a low amplitude exists in the pulse signal, the signal value of the pulse signal may be 0. (3) The radar receiver may be a low correlation sequence-based receiver mainly used for performing sequence correlation detection on the received signal. Referring to FIG. 17, correlation detection performed on the sensing signal in the embodiment of the present application may include directly performing correlation detection on the received sensing signal to determine the delay of the sensing signal, or may include performing correlation detection on the received sensing signal after the received sensing signal is processed by the mixer to acquire the delay of the signal. The sensing signal in the present application is an FMC-based signal, so the first received signal is processed by an FMCW-based receiver. The transmitted self-interference signal may be eliminated in monostatic sensing, and simultaneously, distortion of FMCW or interference caused by data may also be suppressed through accumulated energy. Referring to FIG. 18, main signal processing of the FMCW-based receiver includes two operations, and some low noise amplification and filtering operations are omitted here. The first operation is to mixing the first received signal. The first received signal is the delay of the transmitted signal, and the delay carries distance information. However, the delay is often small and difficult to detect, so an intermediate frequency (IF) signal can be obtained through mixing, and the frequency of the IF signal is exactly the difference between frequencies of transmitting and receiving the signal. After this frequency is obtained, the frequency can be converted into the delay through the slope of the Chirp signal. The second operation is to perform 2D-FFT and perform distance FFT separately on multiple intermediate frequency signals in the time domain to obtain frequencies corresponding to the intermediate frequency signals. The frequencies may be used for representing delays. Then, sequences subjected to multiple times of distance FFT are sequentially used as different row vectors of a matrix. Finally, Doppler FFT is performed on each column of the matrix, and then a two-dimensional delay-Doppler matrix is obtained, where the delay reflects the distance, and Doppler reflects the speed.

Figure 19:
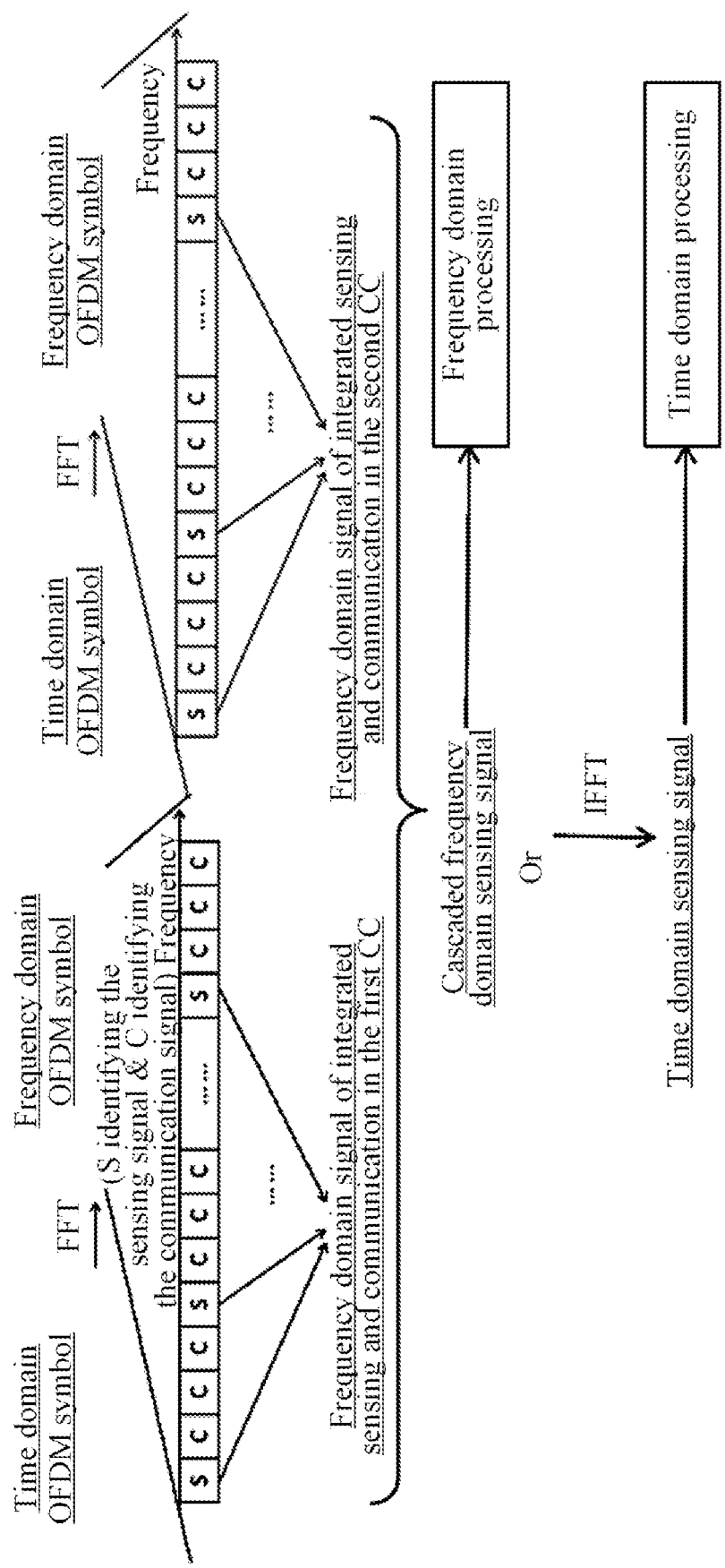
FIG. 19 is another schematic diagram of processing a first received signal according to an embodiment of the present application.

In an exemplary implementation, FIG. 19 is another schematic diagram of processing a first received signal according to an embodiment of the present application. Referring to FIG. 19, the sensing signal in the carrier aggregation signal of integrated sensing and communication may be processed through an OFDM receiver, where the carrier aggregation signal includes both a communication signal and a sensing signal, and the communication signal and the sensing signal are in orthogonal frequency division. The receiving terminal may use an OFDM-based receiver for reception; in this manner, the communication signal and the sensing signal can be separated. The FFT processing may be performed separately on each CC so that the communication signal of the frequency domain is obtained. The communication signal and the sensing signal may be distinguished by different subcarrier positions. The sensing signal of the frequency domain may be extracted, and then sensing signals in the frequency domain of multiple CCs are cascaded into a signal with a larger bandwidth. At this time, the signal may be directly processed in the frequency domain so that sensing information is acquired. For example, the frequency domain channel is estimated, and the frequency domain channel is transformed to the time domain so that the delay, Doppler and other information are acquired. Alternatively, the IFFT processing may be performed on the sensing signal with the larger bandwidth so that the sensing signal is retransformed to a time domain signal, then the signal is processed through the time domain method such as pulse detection or sequence correlation detection.

Figure 20:
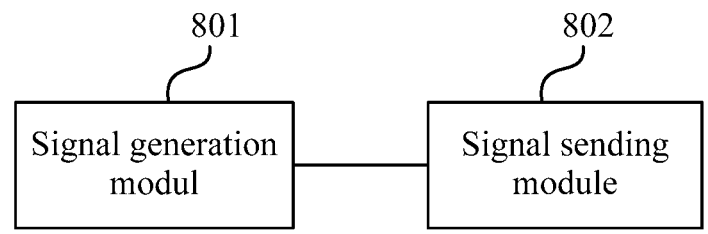
FIG. 20 is a structural diagram of a signal sending apparatus according to an embodiment of the present application.

FIG. 20 is a structural diagram of a signal sending apparatus according to an embodiment of the present application. The apparatus may perform the signal sending method provided in any embodiment of the present application and has function modules and effects corresponding to the method performed. The apparatus may be implemented by software and/or hardware and includes a signal generation module 801 and a signal sending module 802.

The signal generation module 801 is configured to generate a first transmission signal, where the first transmission signal includes a communication signal and a sensing signal, and the sensing signal occupies bandwidth resources of at least two component carriers in a frequency domain.

The signal sensing module 802 is configured to send the first transmission signal.

In the embodiment of the present application, the signal generation module 801 generates the first transmission signal including the communication signal and the sensing signal, where the sensing signal occupies bandwidth resources of at least two component carriers in the frequency domain, and the signal sending module 802 sends the generated first transmission signal. In this manner, the sending of sensing data in the signal of integrated sensing and communication is implemented, the transmission bandwidth of the sensing data is increased, and thus the accuracy of sensing data transmission can be improved.

On the basis of the preceding embodiments of the present application, in the apparatus, the at least two component carriers are sent by the same communication node.

On the basis of the preceding embodiments of the present application, in the apparatus, a guard bandwidth between any two component carriers contiguous in the frequency domain of the at least two component carriers is used for transmitting the sensing signal.

On the basis of the preceding embodiments of the present application, in the apparatus, transmitting the sensing signal and transmitting the communication signal in the at least two component carriers occupy different orthogonal frequency-division multiplexing (OFDM) symbols.

On the basis of the preceding embodiments of the present application, in the apparatus, transmitting the sensing signal and transmitting the communication signal in the at least two component carriers occupy different subcarriers of the same OFDM symbol.

On the basis of the preceding embodiments of the present application, in the apparatus, transmitting the sensing signal and transmitting the communication signal in the at least two component carriers occupy different beams.

On the basis of the preceding embodiments of the present application, carrier aggregation of the sensing signal and carrier aggregation of the communication signal are independent of each other On the basis of the preceding embodiments of the present application, the apparatus further includes at least one of a first time domain unit, a second time domain unit or a third time domain unit.

The first time domain unit is configured to perform inverse Fourier transform on the sensing signal in each component carrier to generate a time domain signal.

The second time domain unit is configured to perform inverse Fourier transform on the sensing signal after aggregation of the at least two component carriers to generate a time domain signal.

The third time domain unit is configured to generate a time domain signal according to a time domain expression of the sensing signal.

On the basis of the preceding embodiments of the present application, in the apparatus, the sensing signal includes at least one of: a frequency modulated continuous wave-based signal, a pulse-based signal or a low correlation sequence-based signal.

On the basis of the preceding embodiments of the present application, in the apparatus, the frequency modulated continuous wave-based signal includes at least one of: a sawtooth linear frequency modulation signal, a triangular linear frequency modulation signal or a segmental linear frequency modulation signal.

On the basis of the preceding embodiments of the present application, in the apparatus, a relationship between the at least two component carriers includes at least one of: intra-band contiguous aggregation, intra-band non-contiguous aggregation or inter-band non-contiguous aggregation.

On the basis of the preceding embodiments of the present application, in the apparatus, the at least two component carriers have a maximum bandwidth limit and a minimum bandwidth limit.

Figure 21:
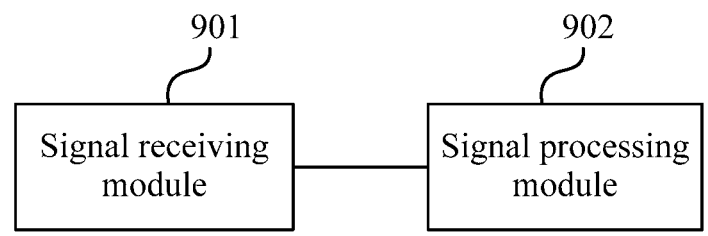
FIG. 21 is a structural diagram of a signal receiving apparatus according to an embodiment of the present application.

FIG. 21 is a structural diagram of a signal receiving apparatus according to an embodiment of the present application. The apparatus may perform the signal receiving method provided in any embodiment of the present application and has function modules and effects corresponding to the method performed. The apparatus may be implemented by software and/or hardware and includes a signal receiving module 901 and a signal processing module 902.

The signal receiving module 901 is configured to receive a first received signal, where the first received signal includes a communication signal and a sensing signal, and the sensing signal occupies bandwidth resources of at least two component carriers in a frequency domain.

The signal processing module 902 is configured to process the first received signal.

In the embodiment of the present application, the signal receiving module 901 receives the first received signal including the communication signal and the sensing signal, where the sensing signal occupies bandwidth resources of at least two component carriers in the frequency domain, and the signal processing module 902 processes the received first received signal. In this manner, the reception of sensing data in the signal of integrated sensing and communication is implemented, the transmission bandwidth of the sensing data is increased, and thus the accuracy of sensing data transmission can be improved.

On the basis of the preceding embodiments of the present application, in the apparatus, the at least two component carriers are sent by the same communication node.

On the basis of the preceding embodiments of the present application, in the apparatus, a guard bandwidth between any two component carriers contiguous in the frequency domain of the at least two component carriers is used for transmitting the sensing signal.

On the basis of the preceding embodiments of the present application, in the apparatus, transmitting the sensing signal and transmitting the communication signal in the at least two component carriers occupy different orthogonal frequency-division multiplexing (OFDM) symbols.

On the basis of the preceding embodiments of the present application, in the apparatus, transmitting the sensing signal and transmitting the communication signal in the at least two component carriers occupy different subcarriers of the same OFDM symbol.

On the basis of the preceding embodiments of the present application, in the apparatus, transmitting the sensing signal and transmitting the communication signal in the at least two component carriers occupy different beams.

On the basis of the preceding embodiments of the present application, carrier aggregation of the sensing signal and carrier aggregation of the communication signal are independent of each other On the basis of the preceding embodiments of the present application, at least one of the following is included: a time domain signal is generated by performing inverse Fourier transform on the sensing signal in each component carrier of the at least two component carriers; a time domain signal is generated by performing inverse Fourier transform on the sensing signal after aggregation of the at least two component carriers; or a time domain signal is generated according to a time domain expression of the sensing signal.

On the basis of the preceding embodiments of the present application, in the apparatus, the sensing signal includes at least one of: a frequency modulated continuous wave-based signal, a pulse-based signal or a low correlation sequence-based signal.

On the basis of the preceding embodiments of the present application, in the apparatus, the frequency modulated continuous wave-based signal includes at least one of: a sawtooth linear frequency modulation signal, a triangular linear frequency modulation signal or a segmental linear frequency modulation signal.

On the basis of the preceding embodiments of the present application, in the apparatus, a relationship between the at least two component carriers includes at least one of: intra-band contiguous aggregation, intra-band non-contiguous aggregation or inter-band non-contiguous aggregation.

On the basis of the preceding embodiments of the present application, in the apparatus, the at least two component carriers have a maximum bandwidth limit and a minimum bandwidth limit.

On the basis of the preceding embodiments of the present application, in the apparatus, the signal processing module 902 includes a separation processing unit.

The separation processing unit is configured to process the communication signal and the sensing signal of the first received signal through an orthogonal frequency-division multiplexing receiver and a radar receiver respectively.

On the basis of the preceding embodiments of the present application, in the apparatus, the signal processing module 902 includes a frequency division processing unit.

The frequency division processing unit is configured to process the first received signal through an orthogonal frequency-division multiplexing receiver.

On the basis of the preceding embodiments of the present application, the separation processing unit is configured to perform carrier mixing on the first received signal to acquire a baseband signal, and perform two-dimensional Fourier transform on the baseband signal.

On the basis of the preceding embodiments of the present application, the separation processing unit is configured to perform carrier mixing on the first received signal to acquire a baseband signal, perform fast Fourier transform on the baseband signal and acquire the sensing signal, and process the sensing signal in the frequency domain.

On the basis of the preceding embodiments of the present application, the separation processing unit is configured to perform carrier mixing on the first received signal to acquire a baseband signal, and perform sequence correlation on the first received signal or the baseband signal and perform detection according to a correlation peak of the sequence correlation.

On the basis of the preceding embodiments of the present application, the frequency division processing unit is configured to perform fast Fourier transform on the first received signal to separate the communication signal and the sensing signal, and perform time domain processing after frequency domain processing is performed on the sensing signal or inverse Fourier transform is performed on the sensing signal.

Figure 22:
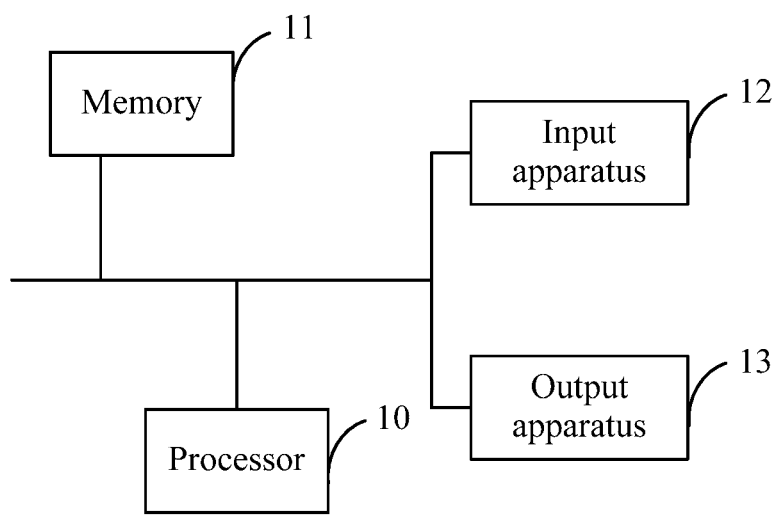
FIG. 22 is a structural diagram of an electronic device according to an embodiment of the present application.

FIG. 22 is a structural diagram of an electronic device according to an embodiment of the present application. The electronic device includes a processor 10, a memory 11, an input apparatus 12 and an output apparatus 13. One or more processors 10 may be included in the electronic device. One processor 10 is shown as an example in FIG. 22. The processor 10, the memory 11, the input apparatus 12 and the output apparatus 13 in the electronic device may be connected via a bus or in other manners. The connection via a bus is shown as an example in FIG. 22.

As a computer-readable storage medium, the memory 11 may be configured to store software programs, computer-executable programs and modules, for example, modules (the signal generation module 801 and the signal sending module 802, or the signal receiving module 901 and the signal processing module 902) corresponding to the apparatus in the embodiments of the present application. The processor 70 executes software programs, instructions and modules stored in the memory 71 to perform function applications and data processing of the electronic device, that is, to perform the preceding signal sending method and/or signal receiving method.

The memory 11 may mainly include a program storage region and a data storage region. The program storage region may store an operating system and an application program required by at least one function. The data storage region may store data created based on the use of the electronic device. Additionally, the memory 11 may include a high-speed random-access memory and may also include a non-volatile memory, such as at least one magnetic disk memory, a flash memory or another nonvolatile solid-state memory. In some examples, the memory 11 may include memories that are remotely disposed relative to the processor 10 and these remote memories may be connected to the electronic device via a network. Examples of the preceding network include, but are not limited to, the Internet, an intranet, a local area network, a mobile communication network and a combination thereof.

The input apparatus 12 may be configured to receive inputted digital or character information and generate key signal input related to user settings and function control of the electronic device. The output apparatus 13 may include a display device such as a display screen.

The embodiments of the present application further provide a storage medium including computer-executable instructions. When executed by a computer processor, the computer-executable instructions are used for causing the computer processor to perform a signal sending method. The method includes the following.

A first transmission signal is generated, where the first transmission signal includes a communication signal and a sensing signal, and the sensing signal occupies bandwidth resources of at least two component carriers in a frequency domain; and the first transmission signal is sent.

Moreover/alternatively, when executed by the computer processor, the computer-executable instructions are used for causing the computer processor to perform a signal receiving method. The method includes the following.

A first received signal is received, where the first received signal includes a communication signal and a sensing signal, and the sensing signal occupies bandwidth resources of at least two component carriers in a frequency domain; and the first received signal is processed.

From the preceding description of the embodiments, the present application may be implemented by means of both software and required general-purpose hardware or by means of hardware. Technical solutions of the present application may be essentially embodied in the form of a software product. The software product in a computer may be stored in a computer-readable storage medium such as a floppy disk, a read-only memory (ROM), a random-access memory (RAM), a flash memory, a hard disk or an optical disc in the computer and includes several instructions for enabling a computer device (which may be a personal computer, a server or a network device) to perform the method of the embodiments of the present application.

Units and modules included in the embodiment of the preceding apparatus are divided according to functional logic, and the division is not limited to this as long as the corresponding functions can be implemented. Additionally, the names of function units are only intended for distinguishing between each other and are not to limit the scope of the present application.

It is to be understood by those having ordinary skill in the art that some or all operations of the preceding method and function modules/units in the preceding system or device may be implemented as software, firmware, hardware and suitable combinations thereof.

In the hardware implementation, the division of the preceding function modules/units may not correspond to the division of physical components. For example, one physical component may have multiple functions, or one function or operation may be performed jointly by several physical components. Some or all physical components may be implemented as software executed by a processor such as a central processing unit, a digital signal processor or a microprocessor, may be implemented as hardware, or may be implemented as integrated circuits such as application-specific integrated circuits. Such software may be distributed on computer-readable media. The computer-readable media may include computer storage media (or non-transitory media) and communication media (or transitory media). As known to those of ordinary skill in the art, the term "the computer storage media" includes volatile and nonvolatile as well as removable and non-removable media implemented in any method or technology for storing information (such as computer-readable instructions, data structures, program modules or other data). The computer storage media include, but are not limited to, a RAM, a ROM, an electrically erasable programmable read-only memory (EEPROM), a flash memory, or other memory technologies, a compact disc read-only memory (CD-ROM), a digital versatile disk (DVD) or other optical disc memories, magnetic cassettes, magnetic tapes, magnetic disk memories or other magnetic storage apparatuses, or any other medium used for storing the desired information and accessible by a computer. Moreover, as known to those of ordinary skill in the art, the communication media generally include computer-readable instructions, data structures, program modules, or other data in carriers or in modulated data signals transported in other transport mechanisms and may include any information delivery medium.

What is claimed is:

1. A signal sending method, comprising:
    generating a first transmission signal, wherein the first transmission signal comprises a communication signal and a sensing signal, and the sensing signal occupies bandwidth resources of at least two component carriers in a frequency domain; and
    sending the first transmission signal.

2. The method according to claim 1, wherein,
    the at least two component carriers are sent by a same communication node; or
    a guard bandwidth between two component carriers of the at least two component carriers is used for transmitting the sensing signal, wherein the two component carriers are contiguous in the frequency domain; or
    in the at least two component carriers, a component carrier for transmitting the sensing signal and a component carrier for transmitting the communication signal occupy different orthogonal frequency-division multiplexing symbols; or
    in the at least two component carriers, a component carrier for transmitting the sensing signal and a component carrier for transmitting the communication signal occupy different subcarriers of a same orthogonal frequency-division multiplexing symbol; or
    in the at least two component carriers, a component carrier for transmitting the sensing signal and a component carrier for transmitting the communication signal occupy different beams; or
    carrier aggregation of the sensing signal and carrier aggregation of the communication signal are independent of each other.

3. The method according to claim 2, wherein the sensing signal comprises at least one of: a frequency modulated continuous wave-based signal, a pulse-based signal or a low correlation sequence-based signal.

4. The method according to claim 3, wherein the frequency modulated continuous wave-based signal comprises at least one of: a sawtooth linear frequency modulation signal, a triangular linear frequency modulation signal or a segmental linear frequency modulation signal.

5. The method according to claim 1, further comprising at least one of:
    performing inverse Fourier transform on the sensing signal in each component carrier of the at least two component carriers to generate a time domain signal;
    performing inverse Fourier transform on the sensing signal after aggregation of the at least two component carriers to generate a time domain signal; or
    generating a time domain signal according to a time domain expression of the sensing signal.

6. The method according to claim 1, wherein,
    a relationship between the at least two component carriers comprises at least one of: intra-band contiguous aggregation, intra-band non-contiguous aggregation or inter-band non-contiguous aggregation; or
    the at least two component carriers have a maximum bandwidth limit and a minimum bandwidth limit.

7. A non-transitory computer-readable storage medium storing at least one program executable by at least one processor to perform at least one of: the signal sending method according to claim 1.

8. The method according to claim 1, wherein the sensing signal comprises at least two part sensing signals carried by the at least two component carriers, and the at least two part sensing signals are associated with each other.

9. The method according to claim 8, wherein the sensing signal comprises at least one of: a frequency modulated continuous wave-based signal, a pulse-based signal or a low correlation sequence-based signal.

10. The method according to claim 9, wherein the frequency modulated continuous wave-based signal comprises at least one of: a sawtooth linear frequency modulation signal, a triangular linear frequency modulation signal or a segmental linear frequency modulation signal.

11. A signal receiving method, comprising:
    receiving a first received signal, wherein the first received signal comprises a communication signal and a sensing signal, and the sensing signal occupies bandwidth resources of at least two component carriers in a frequency domain; and
    processing the first received signal.

12. The method according to claim 11, wherein at least one of the following is comprised:
    a time domain signal is generated by performing inverse Fourier transform on the sensing signal in each component carrier of the at least two component carriers;
    a time domain signal is generated by performing inverse Fourier transform on the sensing signal after aggregation of the at least two component carriers; or
    a time domain signal is generated according to a time domain expression of the sensing signal.

13. The method according to claim 11, wherein processing the first received signal comprises:

processing the communication signal through an orthogonal frequency-division multiplexing receiver and processing the sensing signal of the first received signal through a radar receiver.

14. The method according to claim 13, wherein processing the sensing signal of the first received signal through the radar receiver comprises:
performing carrier mixing on the first received signal to acquire a baseband signal; and
performing two-dimensional Fourier transform on the baseband signal.

15. The method according to claim 13, wherein processing the sensing signal of the first received signal through the radar receiver comprises:
performing carrier mixing on the first received signal to acquire a baseband signal;
performing fast Fourier transform on the baseband signal to acquire the sensing signal; and
processing the sensing signal in the frequency domain.

16. The method according to claim 13, wherein processing the sensing signal of the first received signal through the radar receiver comprises:
performing carrier mixing on the first received signal to acquire a baseband signal; and
performing sequence correlation on the first received signal or the baseband signal, and performing detection according to a correlation peak of the sequence correlation.

17. The method according to claim 11, wherein processing the first received signal comprises:
processing the first received signal through an orthogonal frequency-division multiplexing receiver.

18. The method according to claim 17, wherein processing the first received signal through the orthogonal frequency-division multiplexing receiver comprises:
performing fast Fourier transform on the first received signal to separate the communication signal and the sensing signal; and
performing time domain processing after performing frequency domain processing on the sensing signal or performing inverse Fourier transform on the sensing signal.

19. The method according to claim 11, wherein the sensing signal comprises at least two part sensing signals carried by the at least two component carriers, and the at least two part sensing signals are associated with each other.

20. An electronic device, comprising:
at least one processor; and
a memory configured to store at least one program;
wherein the at least one program, when executed by the at least one processor, causes the at least one processor to perform;
generating a first transmission signal, wherein the first transmission signal comprises a communication signal and a sensing signal, and the sensing signal occupies bandwidth resources of at least two component carriers in a frequency domain; and
sending the first transmission signal.

* * * * *